US012565927B2

(12) United States Patent
Lenon et al.

(10) Patent No.: US 12,565,927 B2
(45) Date of Patent: Mar. 3, 2026

(54) WORK VEHICLE WITH COORDINATED ELECTRIC TRANSAXLES

(71) Applicant: Deere & Company, Moline, IL (US)

(72) Inventors: Caleb C. Lenon, Chetopa, KS (US);
Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 408 days.

(21) Appl. No.: 18/343,352

(22) Filed: Jun. 28, 2023

(65) Prior Publication Data

US 2025/0003489 A1     Jan. 2, 2025

(51) Int. Cl.
*B60K 17/356*     (2006.01)
*B60K 17/354*     (2006.01)
(Continued)

(52) U.S. Cl.
CPC ......... *F16H 61/702* (2013.01); *B60K 17/354* (2013.01); *B60K 17/356* (2013.01);
(Continued)

(58) Field of Classification Search
CPC ........ F16H 61/702; F16H 59/44; F16H 59/52; F16H 61/04; F16H 2059/443;
(Continued)

(56) References Cited

U.S. PATENT DOCUMENTS 6,932,179 B2     8/2005  Sakikawa et al.
7,211,025 B2     5/2007  Fujioka
(Continued)

FOREIGN PATENT DOCUMENTS

CN     105966221 A     9/2016
CN     107031391 A     8/2017
(Continued)

OTHER PUBLICATIONS

Espace translation of DE 10 2021 103819 A1 (Year: 2021).*
(Continued)

*Primary Examiner* — Jason D Shanske
*Assistant Examiner* — Scott Lawrence Strickler
(74) *Attorney, Agent, or Firm* — KLINTWORTH & ROZENBLAT LLP

(57)     ABSTRACT

A work vehicle has two transaxles carried by a chassis each having wheel end units rotatable to drive ground-engaging members about wheel axes and having electric machines powering transmission configured to effect multiple gear ratios. The electric transaxles are operationally mechanically uncoupled. One or more sensors detect speed, heading, and loading characteristics of the work vehicle. A controller, having memory and processing architecture, is configured to process control to: receive from the one or more sensors input of the speed, heading, and loading characteristics of the work vehicle. The controller determines a shift pair sequence for shifting the first transmission and the second transmission based on the received input of the speed, heading, and loading characteristics of the work vehicle. The shift pair sequence defines a shift time ($t_{S1}$) for shifting the first transmission and a shift time ($t_{S2}$) for shifting the second transmission in which the shift time $t_{S1}$ is the same or different than the shift time $t_{S2}$. The controller generates a first shift command to shift the first transmission at the shift time $t_{S1}$ while the second electric transaxle drives the work vehicle and generate a second shift command to shift the second transmission at the shift time $t_{S2}$ while the first electric transaxle drives the work vehicle.

20 Claims, 16 Drawing Sheets

(51) Int. Cl.

| | |
|---|---|
| *F16H 59/44* | (2006.01) |
| *F16H 59/52* | (2006.01) |
| *F16H 59/66* | (2006.01) |
| *F16H 61/04* | (2006.01) |
| *F16H 61/70* | (2006.01) |
| *F16H 59/50* | (2006.01) |

(52) U.S. Cl.
CPC .............. *F16H 59/44* (2013.01); *F16H 59/52* (2013.01); *F16H 61/04* (2013.01); *F16H 2059/443* (2013.01); *F16H 2059/503* (2013.01); *F16H 2059/525* (2013.01); *F16H 2059/663* (2013.01)

(58) Field of Classification Search
CPC ......... F16H 2059/503; F16H 2059/525; F16H 2059/663; B60K 17/354; B60K 17/356
See application file for complete search history.

(56) References Cited

U.S. PATENT DOCUMENTS

| | | | |
|---|---|---|---|
| 7,617,025 | B2 | 11/2009 | Yamamoto et al. |
| 8,965,609 | B2 | 2/2015 | Takagi |
| 9,334,940 | B2 | 5/2016 | Neumann |
| 11,084,369 | B2 | 8/2021 | Watt et al. |
| 2008/0300101 | A1 | 12/2008 | Jarzyna et al. |
| 2010/0025131 | A1 | 2/2010 | Gloceri et al. |
| 2012/0029779 | A1 | 2/2012 | Dickinson et al. |
| 2013/0075183 | A1 | 3/2013 | Kochidomari et al. |
| 2017/0120899 | A1 | 5/2017 | Sugimoto et al. |
| 2018/0031119 | A1 * | 2/2018 | Maurer ................... F16H 59/44 |
| 2022/0325781 | A1 | 10/2022 | Sten et al. |
| 2023/0250862 | A1 | 8/2023 | Brammer et al. |
| 2025/0277520 | A1 | 9/2025 | Gurd et al. |

FOREIGN PATENT DOCUMENTS

| | | | | |
|---|---|---|---|---|
| CN | 111301161 | A | 6/2020 | |
| DE | 102011056046 | A1 | 6/2013 | |
| DE | 102019203901 | A1 | 9/2019 | |
| DE | 102021103819 | A1 * | 8/2021 | ............ B60W 10/26 |
| DE | 102021103829 | A1 | 8/2021 | |
| EP | 3412485 | A1 | 9/2020 | |
| JP | 2009532277 | A | 5/2019 | |
| WO | WO 2023066521 | A1 | 4/2023 | |

OTHER PUBLICATIONS

German Search Report issued in application No. 102024114809.8 dated Dec. 20, 2024, 14 pages.
German Search Report issued in application No. 102024104251.6 dated Oct. 30, 2024, 12 pages.
German Search Report issued in application No. 102024104730.5 dated Nov. 6, 2024, 10 pages.
Hindawi, (Yanchao Zhang et al.) Research Article, "Dynamic Analysis of High-Speed Helical Gear Transmission in Pure Electric Vehicle Gearbox", Shock and Vibration, vol. 2020, Article ID 6639372, https://doi.org/10.1155/2020/6639372, 19 pages.
MDPI Applied Sciences, (Jae-Oh Han et al.) Article, "Design 2-Speed Transmission for Compact Electric Vehicle Using Dual Brake System", College of Engineering, Chung-ang University, 84, Heukseok-ro, Dongjak-gu, Seoul 06974, Korea; Published: Apr. 29, 2019, 12 pages.
Non-Final Office Action issued in U.S. Appl. No. 18/343,411 dated Oct. 27, 2025.

* cited by examiner

WORK VEHICLE WITH COORDINATED ELECTRIC TRANSAXLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and in particular to transaxles for work vehicles.

BACKGROUND OF THE DISCLOSURE

Work vehicles, such as those used in the agricultural, construction, forestry, and mining industries, typically require high torque drives to provide high tractive forces for traveling over off-road terrain and to power heavy-duty work implements. Large fuel-burning engines (e.g., diesel engines) are the conventional power plants for such heavy-duty work vehicles. Advancing technologies have integrated electric power trains into work vehicles. Challenges have been encountered in the efficient transmission of adequate power to all wheels or tracks of large-scale work vehicles.

SUMMARY OF THE DISCLOSURE

The present disclosure provides a work vehicle having multiple electric transaxles that are operative connected and coordinated by electric control.

Specifically, the present disclosure provides a work vehicle having a chassis supported off the ground by ground-engaging wheels or tracks. The work vehicle includes a first electric transaxle carried by the chassis and having first wheel ends to rotate a first set of the ground-engaging wheels or tracks about a first wheel axis. The first electric transaxle includes a first electric machine having a first rotating shaft and a first transmission driven by the first electric machine and configured to effect multiple gear ratios. The work vehicle includes a second electric transaxle carried by the chassis and having second wheel ends to rotate a second set of the ground-engaging wheels or tracks about a second wheel axis. The second transaxle includes a second electric machine having a second rotating shaft and a second transmission driven by the second electric machine and configured to effect multiple gear ratios. The operation of the first electric transaxle is mechanically uncoupled from the operation of the second electric transaxle. The work vehicle includes one or more sensors to detect speed, heading, and loading characteristics of the work vehicle, which may be configured to detect loading in the form of draft forces exerted on the work vehicle from a towed implement. The work vehicle includes a controller having memory and processing architecture configured to process control logic. The controller processes the control logic to receive from the one or more sensors input of the speed, heading, and loading characteristics of the work vehicle. The controller determines a shift pair sequence for shifting the first transmission and the second transmission based on the received input of the speed, heading, and loading characteristics of the work vehicle. The shift pair sequence defines a shift time ($t_{S1}$) for shifting the first transmission and a shift time ($t_{S2}$) for shifting the second transmission in which the shift time $t_{S1}$ is the same or different than the shift time $t_{S2}$. The controller generates a first shift command to shift the first transmission at the shift time $t_{S1}$ while the second electric transaxle drives the work vehicle and generate a second shift command to shift the second transmission at the shift time $t_{S2}$ while the first electric transaxle drives the work vehicle.

In various embodiments of the work vehicle, the controller may determine the shift pair sequence such that the shift time $t_{S1}$ is before the shift time $t_{S2}$ when the loading on the first electric transaxle is lesser than the loading on the second electric transaxle. The controller may determine the shift pair sequence such that the shift time $t_{S1}$ is before the shift time $t_{S2}$ when the first electric transaxle is vertically above the second electric transaxle. The controller may determine the shift pair sequence to include a shift time delta ($\Delta t_S$) between the shift time $t_{S1}$ and the shift time $t_{S2}$. The shift time delta $\Delta t_S$ may be greater when the work vehicle is on level ground than when on sloped ground. The shift time delta $\Delta t_S$ may be greater when the work vehicle is below a threshold load capacity.

In these and other embodiments, the first electric transaxle is at a front of the chassis and the second electric transaxle is a rear of the chassis and the work vehicle accelerates in a forward direction of travel. When the ground-engaging wheels or tracks of the work vehicle encounter upwardly sloped terrain, the controller determines the shift pair sequence such that the shift time $t_{S1}$ is before the shift time $t_{S2}$. When the ground-engaging wheels or tracks of the work vehicle encounter downwardly sloped terrain, the controller determines the shift pair sequence such that the shift time $t_{S1}$ is after the shift time $t_{S2}$. When the ground-engaging wheels or tracks of the work vehicle encounter flat terrain, the controller determines the shift time $t_{S1}$ and the shift time $t_{S2}$ based on loading of the work vehicle. When the loading on the first electric transaxle is greater than the loading on the second electric transaxle, the controller determines the shift pair sequence such that the shift time $t_{S1}$ is before the shift time $t_{S2}$, and, when the loading on the first electric transaxle is less than the loading on the second electric transaxle, the controller determines the shift pair sequence such that the shift time $t_{S1}$ is after the shift time $t_{S2}$.

In these and other embodiments, the first transmission has a first speed mode, a second speed mode, and a third speed mode, and the second transmission has a first speed mode, a second speed mode, and a third speed mode. The controller receives sensor input indicating that: the first electric transaxle is vertically above the second electric transaxle when the first and second transmissions shift from the first speed modes to the second speed modes; and the first electric transaxle is vertically below the second electric transaxle when the first and second transmissions shift from the second speed modes to the third speed modes. The controller determines the shift pair sequence for shifting the first transmission from the first speed mode to the second speed mode and shifting the second transmission from the first speed mode to the second speed mode such that the shift time $t_{S1}$ is before the shift time $t_{S2}$. The controller determines the shift pair sequence for shifting the first transmission from the second speed mode to the third speed mode and shifting the second transmission from the second speed mode to the third speed mode such that the shift time $t_{S1}$ is after the shift 24 time $t_{S2}$.

In another aspect, the disclosure provides a work vehicle having a chassis supported off the ground by ground-engaging wheels or tracks. The work vehicle includes a first electric transaxle carried by the chassis and having first wheel ends to rotate a first set of the ground-engaging wheels or tracks about a first wheel axis. The first electric transaxle includes a first electric machine having a first rotating shaft and a first transmission driven by the first electric machine and configured to effect multiple gear ratios. The work vehicle includes a second electric transaxle carried by the chassis and having second wheel ends to rotate a second set of the ground-engaging wheels or tracks about a second wheel axis. The second transaxle includes a second electric machine having a second rotating shaft and a second transmission driven by the second electric machine and configured to effect multiple gear ratios. The operation of the first electric transaxle is mechanically uncoupled from the operation of the second electric transaxle. The work vehicle includes one or more sensors to detect speed, heading, and loading characteristics of the work vehicle, which may be configured to detect loading in the form of draft forces exerted on the work vehicle from a towed implement. The work vehicle includes a controller having memory and processing architecture configured to process control logic. The controller processes the control logic to receive from the one or more sensors input of the speed, heading, and loading characteristics of the work vehicle. The controller determines a shift pair sequence for shifting the first transmission and the second transmission based on the received input of the speed, heading, and loading characteristics of the work vehicle. The shift pair sequence defines a shift time ($t_{S1}$) for shifting the first transmission and a shift time ($t_{S2}$) for shifting the second transmission in which the shift time $t_{S1}$ is the same or different than the shift time $t_{S2}$. The controller generates a first shift command to shift the first transmission at the shift time $t_{S1}$ while the second electric transaxle drives the work vehicle and generate a second shift command to shift the second transmission at the shift time $t_{S2}$ while the first electric transaxle drives the work vehicle. The controller determines the shift pair sequence such that the shift time $t_{S1}$ is before the shift time $t_{S2}$ when the loading on the first electric transaxle is lesser than the loading on the second electric transaxle or when the first electric transaxle is vertically above the second electric transaxle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
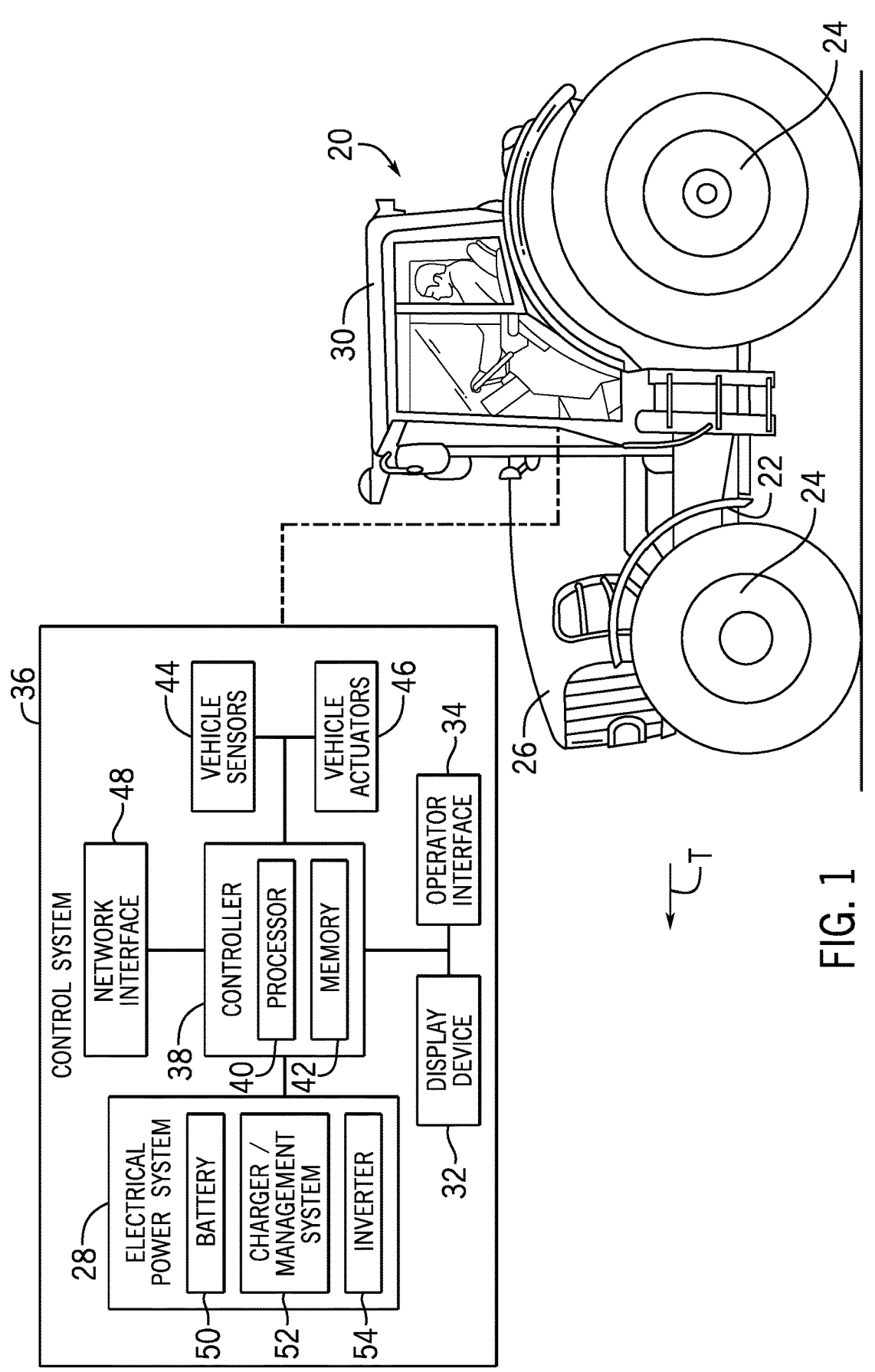
FIG. 1 is a schematic side view of an example work vehicle in the form of an agricultural tractor having one or more electric transaxles in accordance with the present disclosure.

The following describes in one or more example embodiments an electric transaxle and a work vehicle with one or more electric transaxles, as shown in the accompanying figures of the drawings described briefly above. Various modifications to the example embodiments may be contemplated by one of skill in the art. The disclosed electric transaxles are applicable for various large-scale work vehicles, such as those used in agricultural, construction, forestry, mining operations and other types of work environments.

Overview

Large-scale work vehicles, such as those used in the agricultural, construction, forestry, and mining industries, have large power demands to power traction for travel over off-road terrain as well as to power work implements required to perform heavy-duty work operations. Conventionally, internal combustion engines, such as diesel engines, have been the primary power source for such work vehicles. To reduce emissions, modern work vehicles are being electrified. This typically requires the vehicle platforms to be entirely redesigned to optimize the arrangement of vehicle subsystems on the chassis, which can be complex and expensive.

To address these issues, one aspect of the disclosure is an electric transaxle that includes an electric machine having a shaft rotatable about a machine axis. The electric transaxle also includes a transmission rotated by the electric machine shaft and configured to affect multiple gear ratios at an output or speed range gear. The electric transaxle also includes a drive gear rotatable about a wheel axis by the range gear of the transmission. The drive gear has multiple gear mesh locations including a first gear mesh location at an outer circumference of the drive gear and a second gear mesh location at an annular face of the drive gear. The range gear of the transmission may engage the drive gear at the first gear mesh location. An output shaft has an inner end mounting an output gear within the transaxle housing to engage the drive gear at the second gear mesh location and has an outer end extending outside of the transaxle housing.

Another aspect of this disclosure is a work vehicle having two transaxles at least one of which is an electric transaxle. For example, the work vehicle may have a first electric transaxle that is mechanical and a second transaxle that is electric, such as mentioned above and further detailed below. The first and second electric transaxles may be carried by a common chassis and have wheel end units to rotate the associated ground-engaging wheels or tracks.

In various configurations the work vehicle may have no transmission other than the gear sets contained within the electric transaxle. The electric transaxle may be configured compactly with the electric machine positioned vertically above the drive gear and the machine axis, about which the electric machine shaft rotates, offset and parallel with the wheel axis. Further, the output shaft may rotate about an output axis that is perpendicular to the wheel axis.

In these and other configurations, the transmission of the electric transaxle may include a first gear set, disposed at a first side of the machine axis about which the electric machine shaft rotates, and a second gear set, disposed at a second side of the machine axis. The gear sets may be different or identical. For example, the first and second gear sets may be identical cartridge-style components, each providing a multi-speed gear set having a clutch for effecting different gear ratios. The first gear set May interface with the electric machine shaft via a first gear or gear train, and the second gear set may interface with the electric gear shaft via a second gear or gear train that is different from the first gear or gear train. Thus, for example, the two gear sets may be identical two-speed gear sets that when coupled to the electric machine via the two different gear or gear trains cooperate to provide a four-speed transmission. In other examples, the two gear sets may be different, such as including one multi-speed gear set and a single-speed gear set, or including two multi-speed gear sets of different configurations, gear ratios, or number of speed modes. The electric transaxle may also have more than two gear sets.

Another aspect of the disclosure is a work vehicle having two or more electric transaxles in which the two electric transaxles are mechanically uncoupled from one another. For example, a work vehicle with two electric transaxles may have one or more sensors to detect speed, heading, orientation, loading, and other characteristics of the work vehicle as well as having a controller with memory and processing architecture configured to process control logic. The controller may be configured to process control logic to receive the sensor or operator input of the various sensed or other characteristics of the work vehicle. The controller will process the control logic to determine a shift pair sequence for shifting the first transmission of the first electric transaxle and a second transmission of the second electric transaxle based on the received input. The shift pair sequence may define a shift time $t_{S1}$ for shifting the first transmission and a shift time $t_{S2}$ for shifting the second transmission in which the shift time $t_{S1}$ is the same or different than the shift time $t_{S2}$. The controller will execute control logic to generate a first shift command to shift the first transmission at the shift time $t_{S1}$ while the second electric transaxle drives the work vehicle and generate a second shift command to shift the second transmission at the shift time $t_{S2}$ while the first electric transaxle drives the work vehicle.

In various embodiments, the controller determines the shift pair sequence such that the shift time $t_{S1}$ is before the shift time $t_{S2}$ when the loading on the first electric transaxle is less than the loading on the second electric transaxle or when the first electric transaxle is vertically above the second electric transaxle. The controller may determine this shift pair sequence to include a shift time delta $\Delta t_S$ between the shift time $t_{S1}$ and the shift time $t_{S2}$. The shift time delta $\Delta t_S$ may be greater when the work vehicle is on level ground than when on sloped (i.e., pitched) ground. The shift time delta $\Delta t_S$ may be greater when the work vehicle is below a threshold load capacity, thereby allowing more dwell time for a given shift sequence to effect a smoother or seamless shift.

In some embodiments the first electric transaxle is at a front of the work vehicle chassis and the second electric transaxles is at a rear of the chassis, and the work vehicle accelerates in a forward direction of travel. When the ground-engaging wheels or tracks of the work vehicle encounter upwardly sloped terrain, the controller may determine the shift pair sequence such that the shift time $t_{S1}$ is before the shift time $t_{S2}$. When the ground-engaging wheels or tracks of the work vehicle encounter downwardly sloped terrain, the controller may determine the shift pair sequence such that the shift time $t_{S1}$ is after the shift time $t_{S2}$. When the ground-engaging wheels or tracks of the work vehicle encounter flat terrain, the controller may determine the shift time $t_{S1}$ and the shift time $t_{S2}$ based on loading of the work vehicle. For example, when the loading on the first electric transaxle is greater than the loading on the second electric transaxle, the controller may determine the shift pair sequence such that the shift time $t_{S1}$ is before the shift time $t_{S2}$. Conversely, when the loading on the first electric transaxle is less than the loading on the second electric transaxle, the controller May determine the shift pair sequence such that the shift time $t_{S1}$ is after the shift time $t_{S2}$.

The first and second transmissions of the electric transaxles may each be multi-speed transmissions, each including first, second, and third speed modes, or even higher speed modes. The controller may execute the control logic (e.g., stored or transmitted onboard the work vehicle) to perform paired shift sequences in various ways. For example, the controller may receive input (e.g., sensor input), that the first electric transaxle is vertically above the second electric transaxle when the first and second transmissions shift from the first speed modes to the second speed modes, and the first electric transaxle is vertically below the second electric transaxle when the first and second transmissions shift from the second speed modes to the third speed modes. The controller may determine the shift pair sequences for shifting the first and second transmissions from the first speed modes to the second speed modes such that the shift time $t_{S1}$ is before the shift time $t_{S2}$. The controller may determine the shift pair sequences for shifting the first and second transmissions from the second speed modes to the third speed modes such that the shift time $t_{S1}$ is after the shift time $t_{S2}$.

It will be understood that sensor data of the various characteristics of the work vehicle may be provided from onboard, offboard, or a combination of both onboard and offboard sensors. Moreover, the controller may consider parameters and factors pertaining to the work vehicle other than the speed, heading, orientation, and loading of the work vehicle (e.g., work vehicle operating state) when determining the shift pair sequences for shifting the transmissions of the electric transaxles. Also, the sensor data and the various parameters assessed when determining the shift pair sequences may incorporate attributes of an ancillary part of the work vehicle. For example, the controller may receive sensor input regarding draft forces acting upon the work vehicle from a work implement towed or pushed by the work vehicle. The draft forces may be detected by one or more sensors located on the work vehicle or the work implement or remotely to both.

Example Work Vehicles with Electric Transaxle(s)

Referring to FIG. 1, a work vehicle 20 may be implemented as an agricultural tractor or any other heavy-duty work vehicle such as those used in the agricultural, construction, forestry and mining industries. The work vehicle 20 includes a chassis 22 mounting a plurality of ground-engaging members 24, such as wheels or tracks, supporting the chassis 22 off the ground. Supported on the chassis 22 is a main compartment housing 26 and an operator cabin 30 to be occupied by an operator of the work vehicle 20. It should be understood that the present disclosure may also pertain to autonomous work vehicles, in which case the operator cabin may be omitted.

The operator cabin 30 may include one or more display devices 32 and any of various operator interfaces 34 coupled to a control system 36. Apart from the display devices 32, the operator interface devices 34 may include various video and audio devices for providing video and audio information, haptic devices that provide haptic feedback, levers, joysticks, steering wheels, pedals, buttons, and so on. Operator interface devices 34 can also be a set of inputs displayed on the display devices 32, for example, links, icons, or other user actuatable mechanisms. Additionally, or alternatively, some portion of the operator interfaces 34 may be integrated into the display devices 32, such that the operator interfaces 34 may include physical inputs (e.g. buttons, switches, dials, etc.) on or near the display devices 32, a touchscreen module integrated into the display devices 32, or a cursor input device (e.g., a joystick, trackball, or mouse) for positioning a cursor utilized to interface with GUI elements generated on the display devices 32. The display devices 32 can be any image-generating device configured for operation within the operator cabin 30, including one or more dedicated display consoles and various heads-up display projectors.

The display devices 32 and operator interfaces 34 are operatively coupled to the control system 36 with various data connections between these components represented by a number of signal lines generally representative of wired and/or wireless data connections. The control system 36 has one or more controllers 38 or other control architecture that can assume any form suitable for performing the functions described herein, and is used in a non-limiting sense to generally refer to the processing architecture or system of the work vehicle 20 or other computing device or group of devices. For example, the controller 38 can encompass or may be corresponding to any practical number of processors, control computers, computer-readable memories, power supplies, storage devices, interface cards, and other standardized components, and may also include or cooperate with any number of firmware and software programs or computer-readable instructions designed to carry-out the various process tasks, calculations, and control/display functions described herein, all represented by a processor 40. Such computer-readable instructions may be stored within a non-volatile sector of a local onboard memory 42, which is accessible to the controller 38. While generically illustrated as a single block, the memory 42 can encompass any number and type of storage media suitable for storing computer-readable code or instructions, as well as other data utilized to support the operation of the work vehicle 20. The memory 42 may be integrated into the controller architecture in various embodiments such as, for example, a system-in-package, a system-on-a-chip, or another type of microelectronic package or module.

The work vehicle 20 may include various onboard sensors and actuators referred to herein collectively by reference numbers 44 and 46, respectively, and a network interface 48. For example, the work vehicle 20 can include a ground speed sensor that senses the travel speed of work vehicle 20 over a field, for example, by sensing the speed of rotation of the ground-engaging members 24, a drive shaft, the axle, or other components. The travel speed can also be sensed by a positioning system, such as a global positioning system (GPS), a dead reckoning system, a LORAN system, or a wide variety of other systems or sensors that provide an indication of travel speed and heading. The onboard sensors 44 can include various different types of sensor architectures for providing the controller 38 with input pertaining to the operational parameters of the work vehicle 20, data pertaining to the surrounding environment of the work vehicle 20, and other such information useful to operation of the work vehicle 20. The onboard sensors 44 may include some form of receiver, chip set, or the like for determining position utilizing a satellite navigation system including, but not limited to, GPS, Galileo, Global Navigation Satellite System (GNSS or GLONASS), Compass-IGS01, and combinations of the satellites included therein. The onboard sensors 44 can also include various linear and angular position sensors, inertial sensors (e.g., micro-electro-mechanical system inertial measurement units "MEMS IMU" devices), strain sensors, pressure sensors, motor speed sensors, temperature sensors, moisture sensors, wear sensors, vibration sensors, image sensors or cameras, and/or sensors for measuring radio frequency (RF) signals.

Various ones or combinations or the foregoing (or other) sensors will be capable of sensing the travel speed, heading, and spatial orientation (e.g., pitch, roll, and yaw) of the work vehicle 20. Moreover, various ones or combinations or the foregoing (or other) sensors will be capable of sensing the load characteristics (e.g., mass, center of mass, height, etc.) of the work vehicle 20, including loading at work implements attached to or carried onboard the work vehicle 20 (e.g., loader, backhoe, etc.) and work implements towed behind or driven at the front of the work vehicle 20 (e.g., tillage equipment, baler, plow, etc.)

Similarly, the actuators 46 onboard the work vehicle 20 may assume different forms for performing functions supporting its operation. For example, the actuators 46 may serve to provide tractive force to the ground-engaging members 24, operate onboard pneumatic and hydraulic systems, and impart linear or angular motion to work implements attached to the work vehicle 20. The actuators 46 may take any of various forms, including various motors, pumps, linear actuators (e.g., cylinders), solenoids and other valves, clutches, brakes, and any other mechanism that may transmit power from one component to another. The actuators 46 may include mechanical, electrical, and/or hydraulic aspects and thus may be coupled to and receive power from the electrical power system 28.

It should be understood that that the aforementioned onboard sensors 44 and actuators 46 may include any number of sensors and actuators located to sense parameters of various attachments that are propelled by the work vehicle 20. Such attachments may include towed implements attached to the rear of the work vehicle (e.g., various tillage equipment, balers, sprayers, windrowers, backhoes, etc.) as well as implements that attached to the front end of the work vehicle 20 (e.g., various loaders, plows, brushes, etc.). These attachments may receive various forms of power (e.g., electric and hydraulic) so as to be a part of the electrical power system 28, or they may have separate self-contained power systems or be otherwise unpowered.

The network interface 48 can be any device or module providing access to a network, such as a wireless (e.g., WiFi or cellular) transceiver or datalink, including an antenna. The network interface 48 can also include a satellite receiver and may receive data via a satellite link and may allow communication with nearby cellular towers or terrestrial nodes, such as wireless RF nodes included in a controller area network ("CAN") established over an agricultural area (e.g., a field or group of fields) within which the work vehicle 20 operates. Suitable equipment for usage as the network interface 48 includes the line of telematics receivers and transmitters commercially offered by Deere & Company, currently headquartered in Moline, Ill., and marketed under the brand name "JDLink™". Such examples notwithstanding, the particular form assumed by the network interface 48 may vary, providing that network interface 48 provides persistent or intermittent wireless conductivity to the network.

The electrical power system 28 may include one or more battery packs 50 that may include battery cells as well as associated circuitry for delivering power to and from the battery cells of various technologies (e.g., lead acid, lithium, lithium ion, lithium sulfur, lithium iron phosphate, lithium cobalt, nickel metal hydride, nickel cadmium, ultracapacitors, etc.). The battery packs 50 may include temperature sensors and conduits for conducting coolant through the battery packs 50. The electrical power system 28 may include a battery management system ("BMS") 52, which may, for example, manage its charging, detect low-charge conditions, and predict remaining run-time. The BMS 52 may also provide information about the current, voltage, and temperature of the battery packs 50. The BMS 52 may also employ chargers, added to or embedded in the battery packs 50, to charge the battery packs 50 to optimal levels and temperatures. The BMS 52 may include or utilize a general purpose input/output ("GPIO") interface to communicate with battery pack 50. The electrical power system 28 may include one or more inverters 54 to convert direct current ("DC") into alternating current ("AC"). The inverters 54 may take any suitable form, such as an insulated-gate bipolar transistor ("IGBT") inverter and a silicon carbide ("SiC") inverter. The inverters 54 may receive DC current from the battery packs 50 through the GPIO interface and DC bus for receiving DC current from the battery packs 50. The inverters 54 may also receive power from other sources (e.g., an onboard generator or regenerative braking) which may be converted to DC current by the inverter 54 and supplied to the battery packs 50 via the GPIO interface and DC bus.

Figure 2:
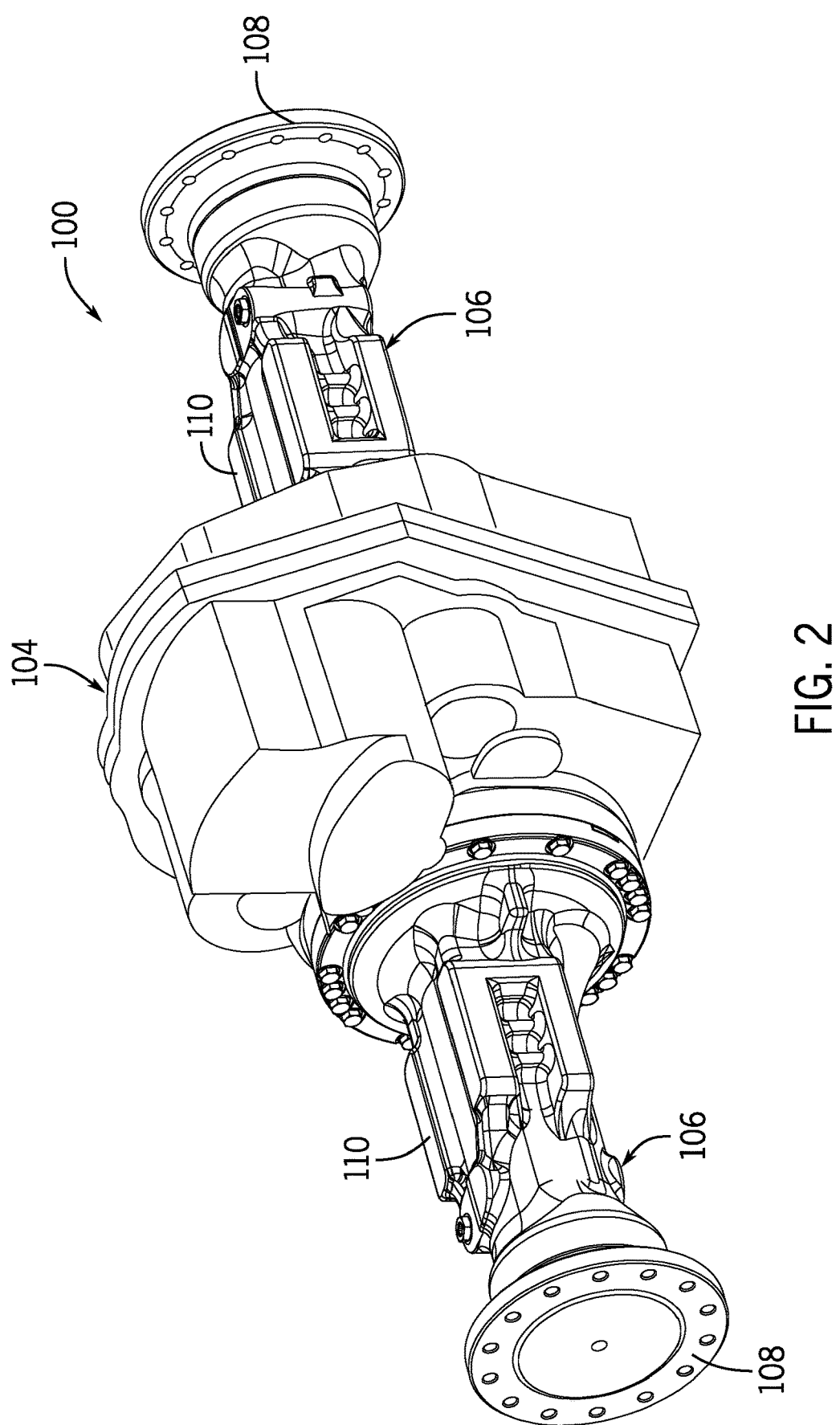
FIG. 2 is an isometric view of an example electric transaxle therefor.

Referring also to FIG. 2, the work vehicle 20 may include an electric transaxle 100 that may be powered by the electrical power system 28 under the control of the controller 38 of the control system 36 to provide tractive control of the ground-engaging members 24 during work and travel operation of the work vehicle 20. In the depicted example, the electric transaxle 100 includes a central powered transmission 102 within a transaxle housing and wheel end units 106 mounted to opposite lateral sides of the transmission 102. The transaxle housing 104 may include a single housing or various sub-housings for various components of the transmission 102, which may be formed monolithically or of multiple separate housing parts.

Figure 8:
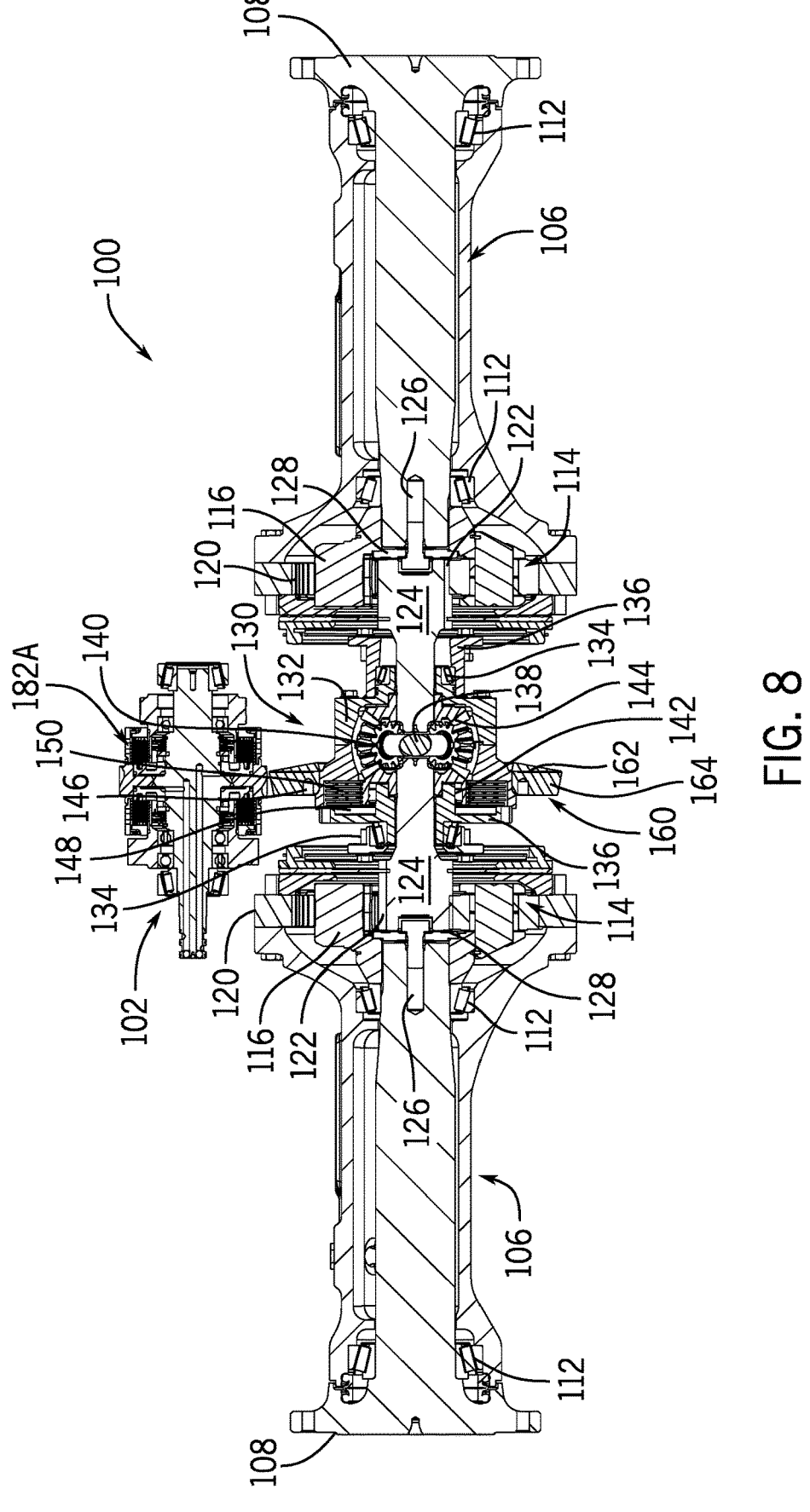
FIG. 8 is a sectional view thereof taken along line 8-8 of FIG. 6.
Figure 10:
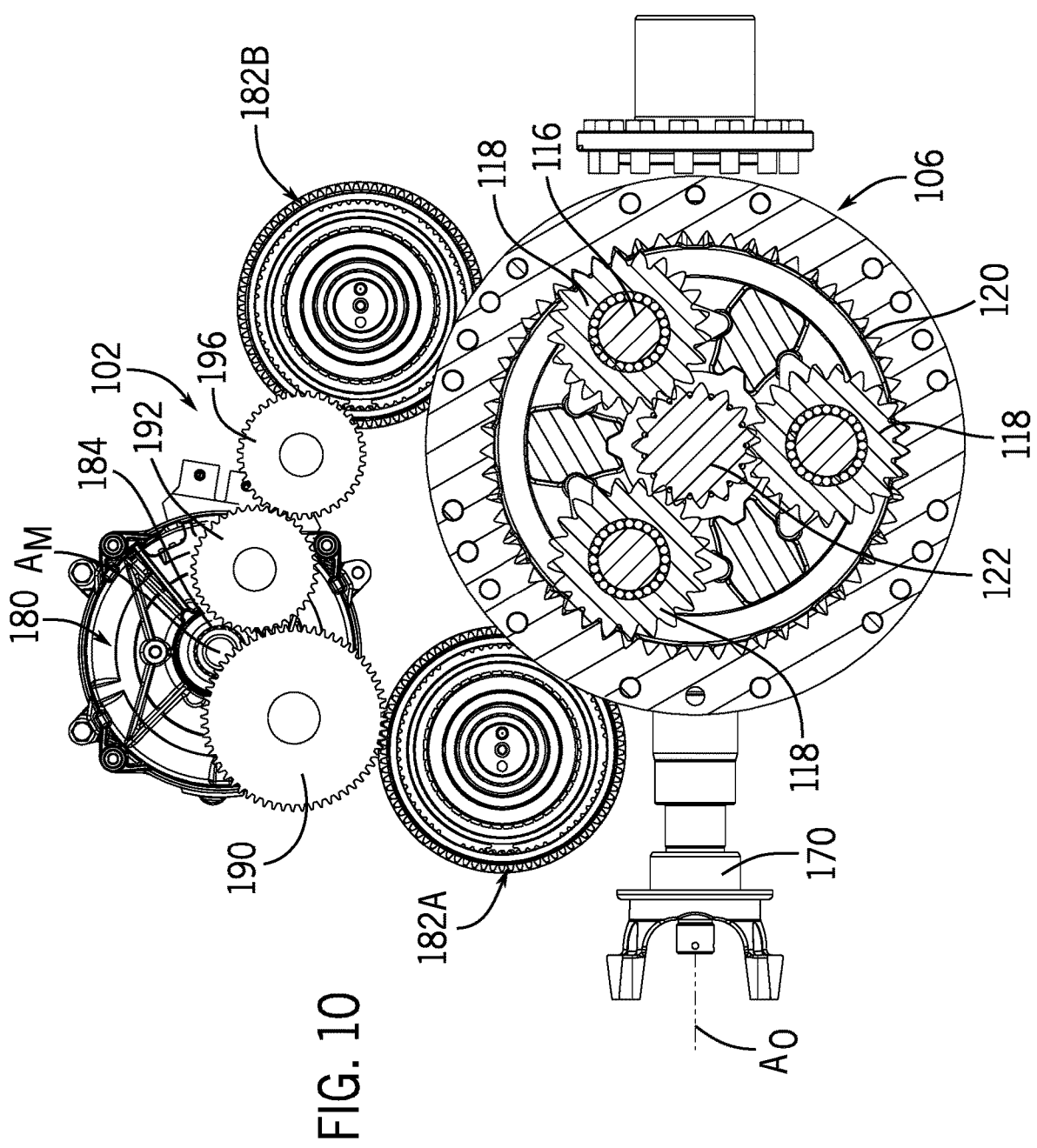
FIG. 10 is a sectional view thereof taken along line 10-10 of FIG. 4.

Referring also to FIG. 8, the wheel end units 106, in the depicted example, are essentially identical (i.e., symmetric left and right versions of the same), and configured to secure to one of the ground-engaging members 24, such as by securing bolts through matching bolt hole patterns on rotatable hubs 108 of the wheel end units 106 and the mating hubs of the ground-engaging member 24. The hubs 108 are elongated members extending through the outer casings 110 of the wheel end units 106 and rotationally supported by one or more bearings 112 at each laterally inner and outer end so as to rotate about a wheel axis $A_W$, about which the ground-engaging members 24 rotate during travel of the work vehicle 20. The laterally inner ends of the elongated hubs 108 couple to final reduction gear sets 114. As also shown in FIG. 10, each final reduction gear set 114 may be embodied as a planetary gear set. However, other types of reduction drives may also be used. In the depicted embodiment, the laterally inner end of each elongated hub 108 is splined or toothed to engage with the splines or teeth of a planet carrier 116. The carrier 116 has pinions that rotatably mount planetary gears 118 (e.g., two, three or more), which are positioned in the annular space between a ring gear 120, which is formed in or fixed relative to the casing of the wheel end unit 106, and a sun gear 122 to mesh with both the ring gear 120 and the sun gear 122. The sun gear 122 is rigidly coupled to a shaft 124 to co-rotate as one unit about the wheel axis $A_W$. Recesses in the laterally outer ends of the shafts 124 accommodate the heads of bolts 126 threaded into the inner ends of the elongated hubs 108 to secure retainer plates 128 in abutment with the carriers 116, and thereby retain the elongated hubs 108 to the carriers 116 for co-rotation therewith. The illustrated final reduction gear sets 114 provides sun-in, carrier-out-type power flow planetary arrangements that effect a deep gear reduction ratio between the power input to the wheel end units 106 and the power output from the wheel end units 106 to the ground-engaging members 24.

Figure 9:
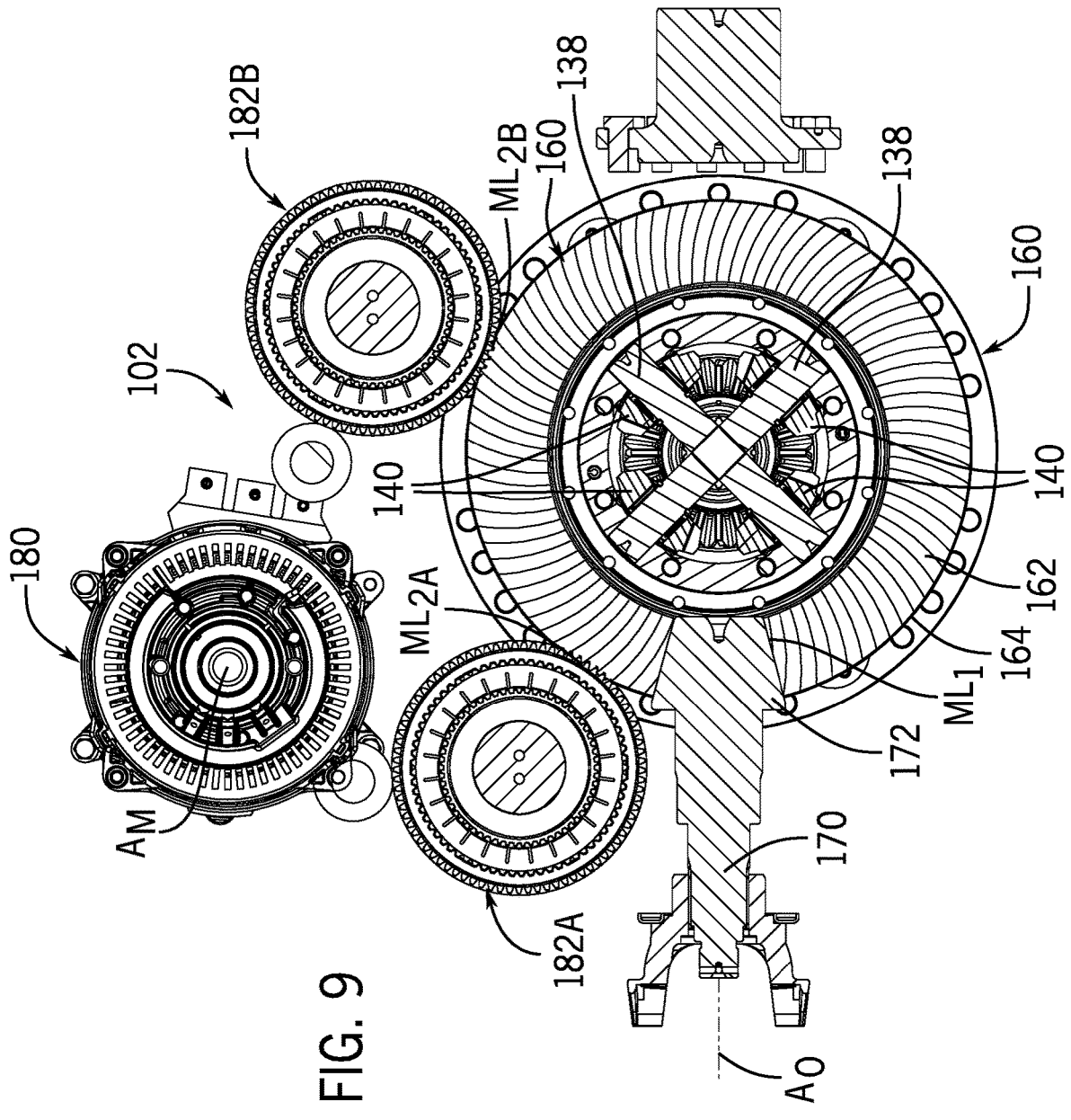
FIG. 9 is a sectional view thereof taken along line 9-9 of FIG. 4.

Referring also to FIG. 9, the laterally inner end of shaft 124 of each final reduction gear set 114 extends into a differential assembly 130 that rotates about the wheel axis $A_W$, relative to the wheel end casings 110 and the transaxle housing 104. In the illustrated example, the differential assembly 130 includes a differential casing 132 that rotates on bearings 134 relative to mounting collars 136 coupled to the wheel end casings 110. The differential casing 132 defines an interior cavity in which are disposed differential pinions 138 and pinion gears 140. In the illustrated example there are four differential pinions 138 mounting four pinion gears 140. The differential pinions 138 intersect at right angles and are arranged orthogonal to the wheel axis $A_W$, with their ends fit into recesses in the interior of the differential casing 132. The differential pinion gears 140 engage two side gears 142, 144 positioned on opposite sides of the differential assembly 10 and rigidly fixed (e.g., press-fit or keyed) to the laterally inner ends of the shafts 124. The differential pinion gears 140 and the side gears 142, 144 are embodied as bevel gears such that axes of rotation thereof are perpendicular. As will be understood, the differential assembly 130 enables rotation of the side gears 142, 144 at different speeds, and thereby, to allow the elongated hubs 108 of the wheel end units 106 to drive the ground-engaging members 24 at different rotational speeds. The overall assembly of the gears and other torque transmission components of the wheel end units 106 and the differential assembly 130 that transmit power to the ground-engaging members 24 may be considered to form or be part of a transaxle gear assembly.

In the depicted embodiment, the differential assembly 130 can be locked by a brake 146. The brake 146 may be activated electro-hydraulically, through the operator interface 34 via the control system 36, by moving a piston 148 into engagement with the brake 146. The brake 146 has a pack 150 of alternately interleaved plates and friction discs that are alternately splined to the differential casing 132 and an annular hub 152 of the side gear 142. Engaging the brake 146 causes the side gear 142 to co-rotate with the differential casing 132, and in so doing, causes the differential pinons 138 and pinion gears 140 to co-rotate the side gear 144 with the side gear 142 and the differential casing 132. This effectively "locks" the differential assembly 130 such that both of the shafts 124 and the elongated hubs 108 also co-rotate together. This, in turn, locks the left and right ground-engaging members 24 to co-rotate together at the same speed, in the manner of a fixed axle.

As shown in FIGS. 8 and 9, and referring also to FIGS. 3-7, power from the transmission 102 of the electric transaxle 100 couple to the differential assembly 130, and thereby the wheel end units 106, through a drive gear 160. The drive gear 160 is rigidly coupled to the differential casing 132 to co-rotate therewith about the wheel axis $A_W$. The drive gear 160 is configured with an annular beveled face 162 defining teeth of any suitable configuration, and which, in the depicted example, are spherical bevel teeth. The drive gear 160 is also configured with a circumferential or peripheral edge 164 also defining teeth, such as spherical bevel teeth. The teeth of the annular beveled face 162 and the circumferential edge 164 of the drive gear 160 define two (or more) separate and distinct mesh points or areas for the transmission of power from the transmission 102 in two separate and distinct power flow directions and purposes. The drive gear 160 thus may serve to drive tractive power to the ground-engaging members 24 and to drive output power to a second power consumer, such as an onboard unpowered axle, transaxle or other system or an offboard work implement or the like, as will be described below.

Figure 3:
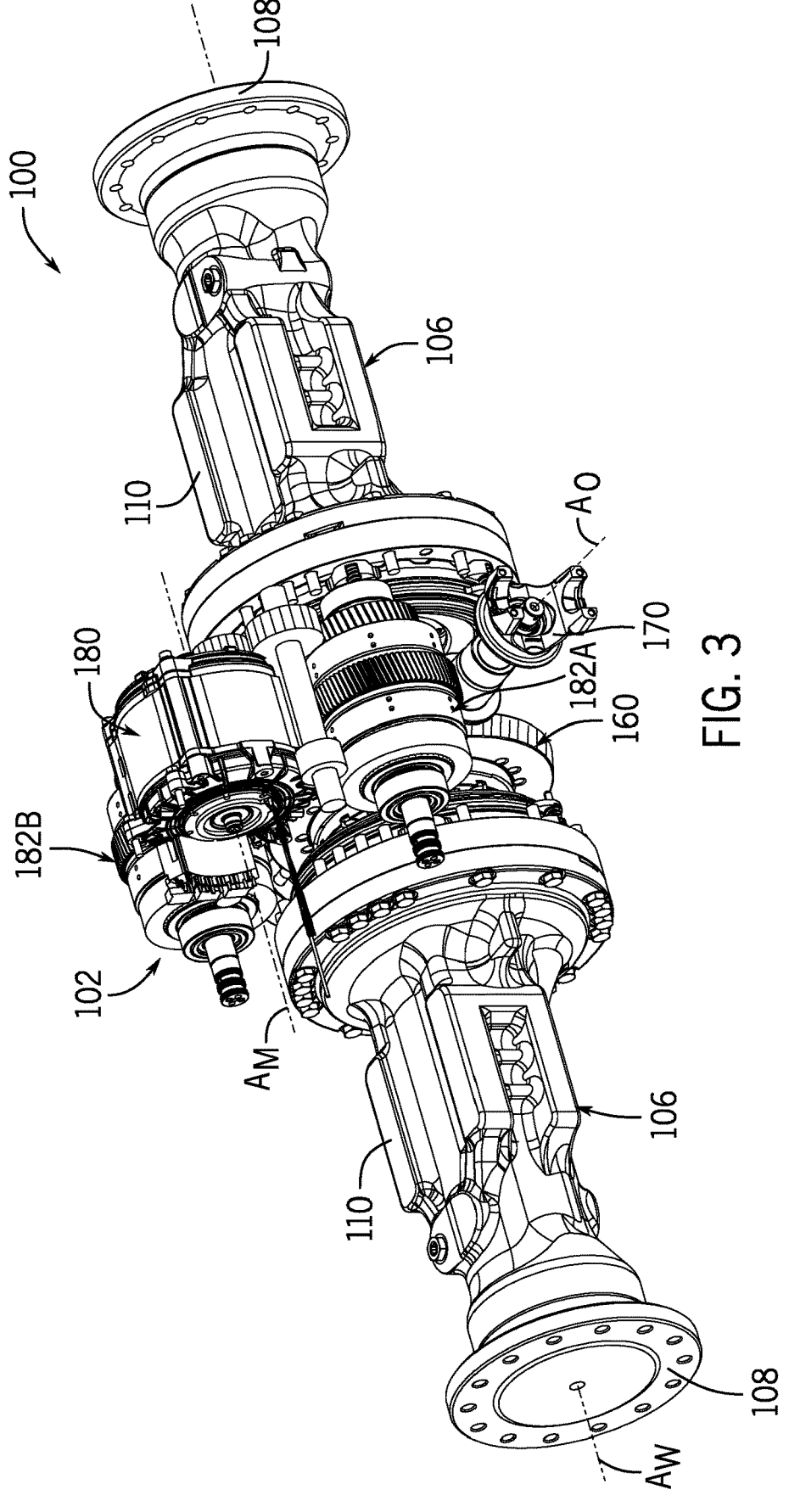
FIG. 3 is an isometric view thereof with an axle housing removed.
Figure 4:
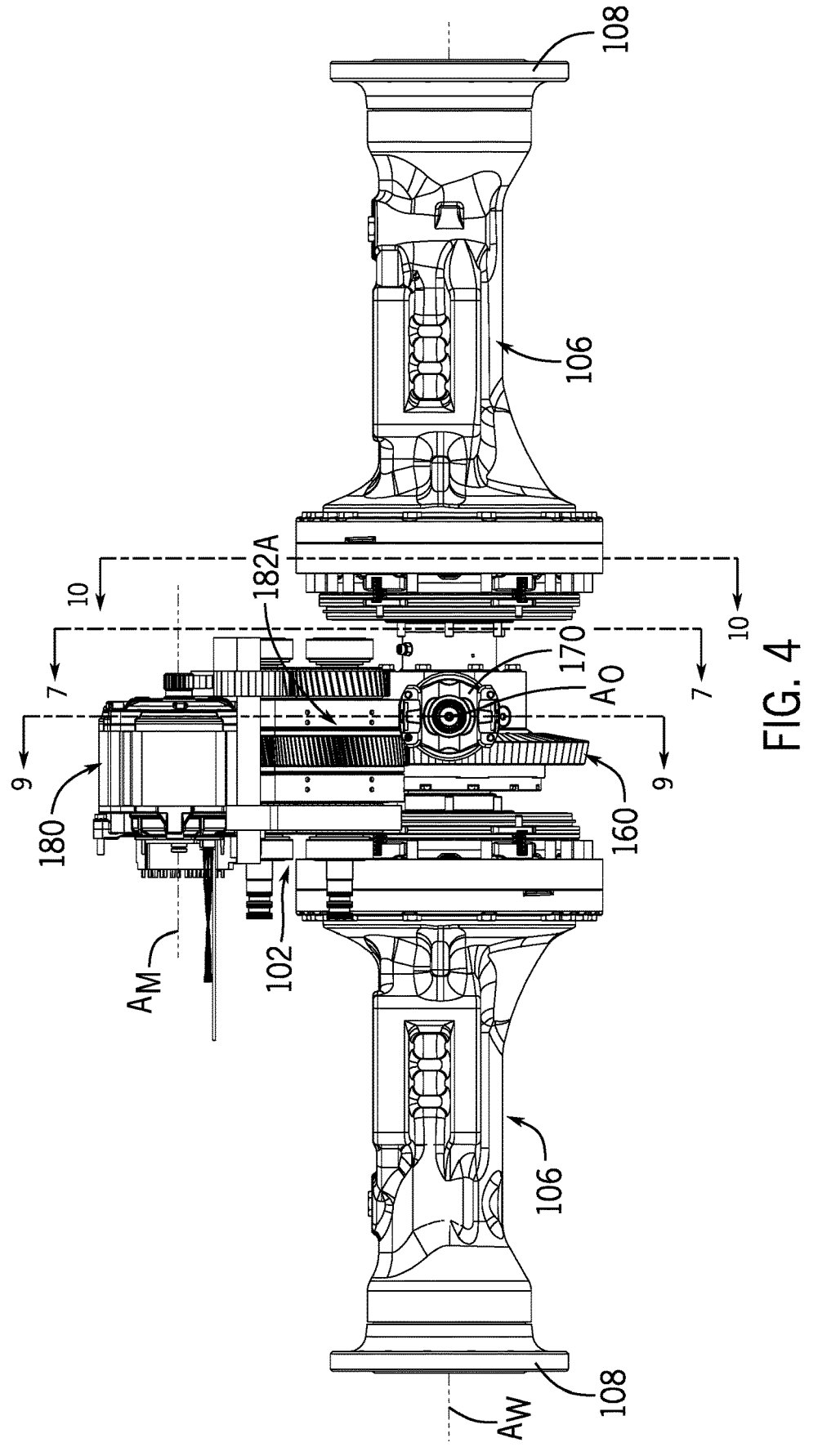
FIG. 4 is a rear elevational view thereof.
Figure 5:
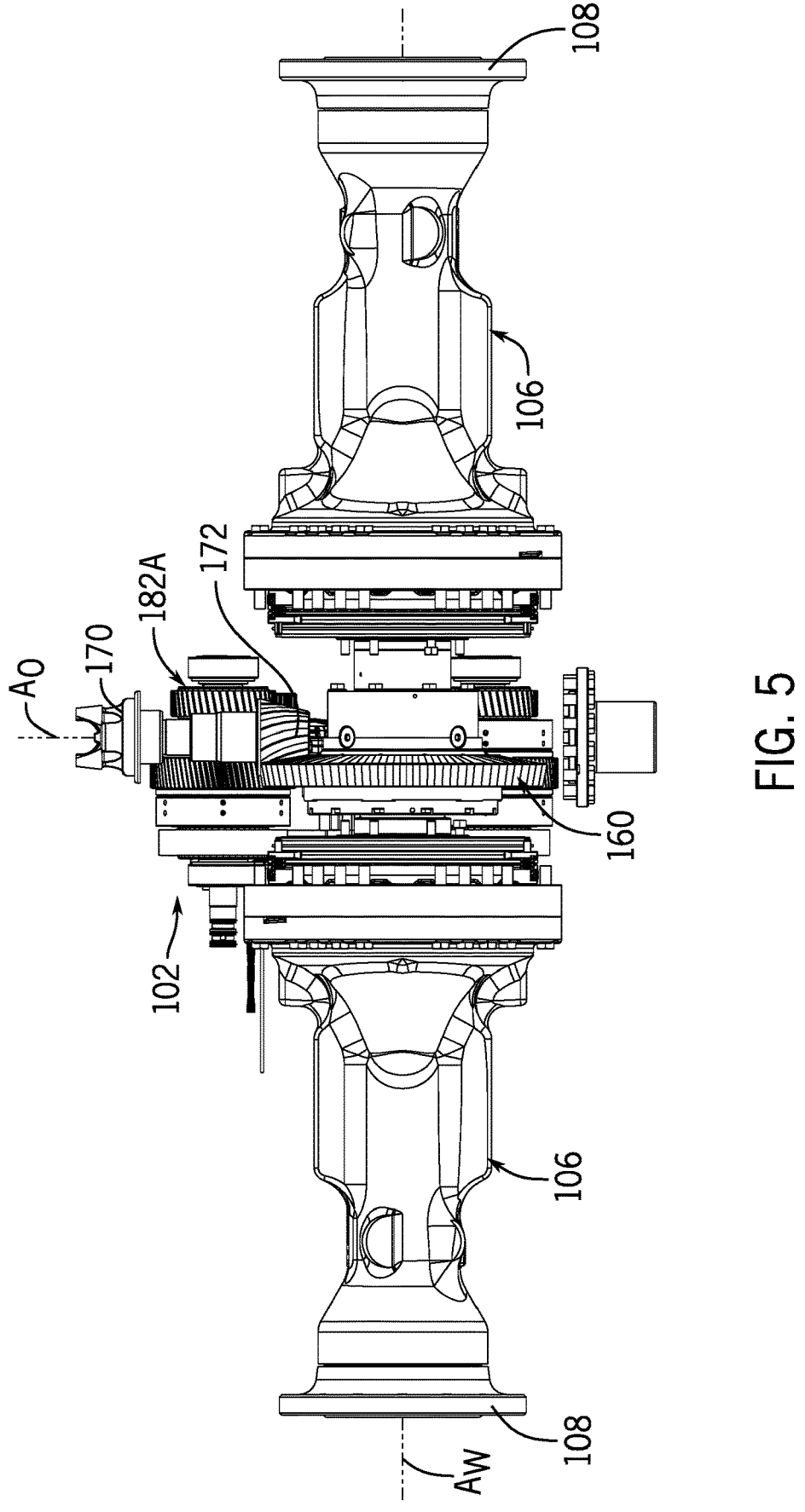
FIG. 5 is a top plan view thereof.
Figure 6:
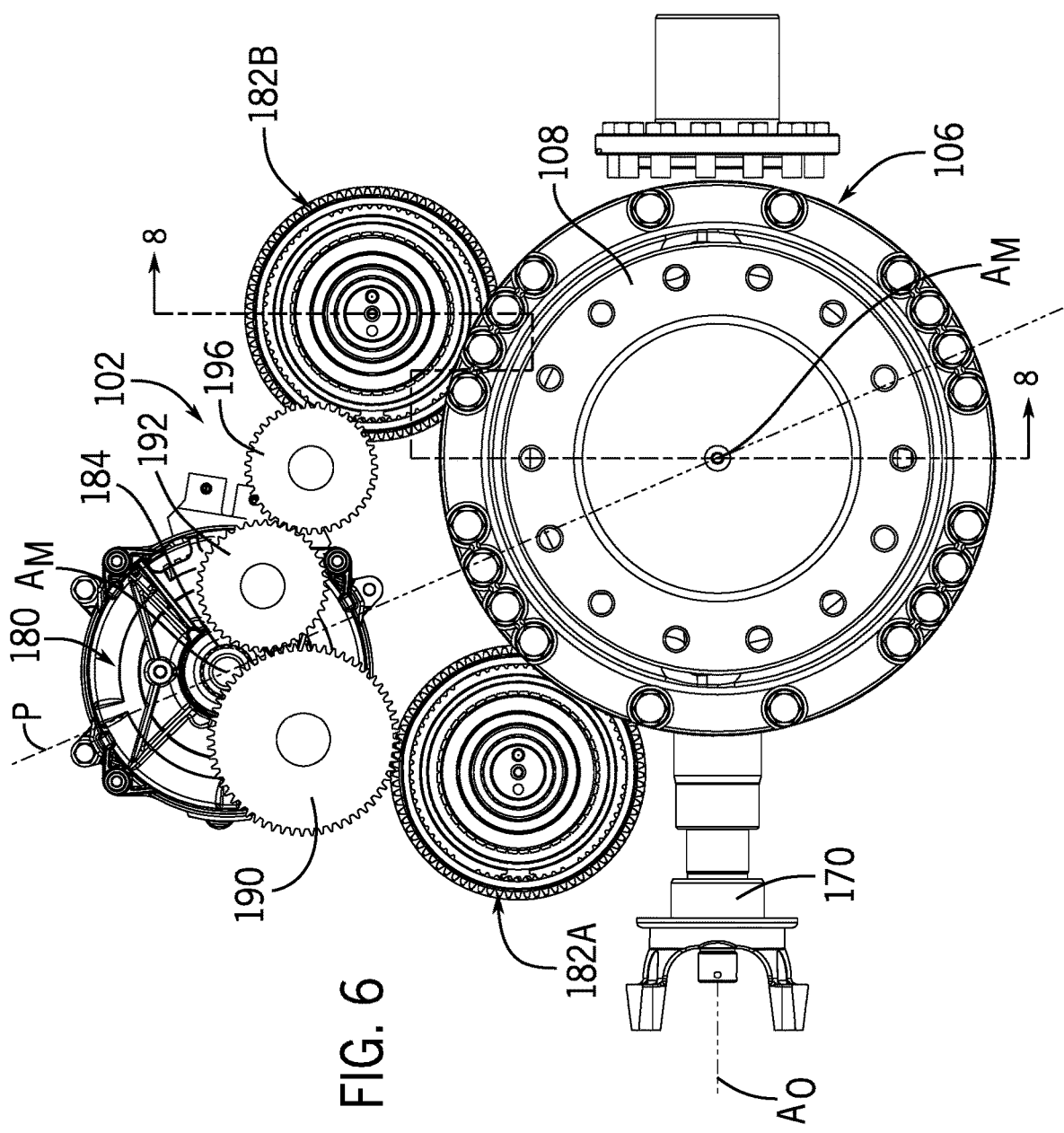
FIG. 6 is an end elevational view thereof.
Figure 7:
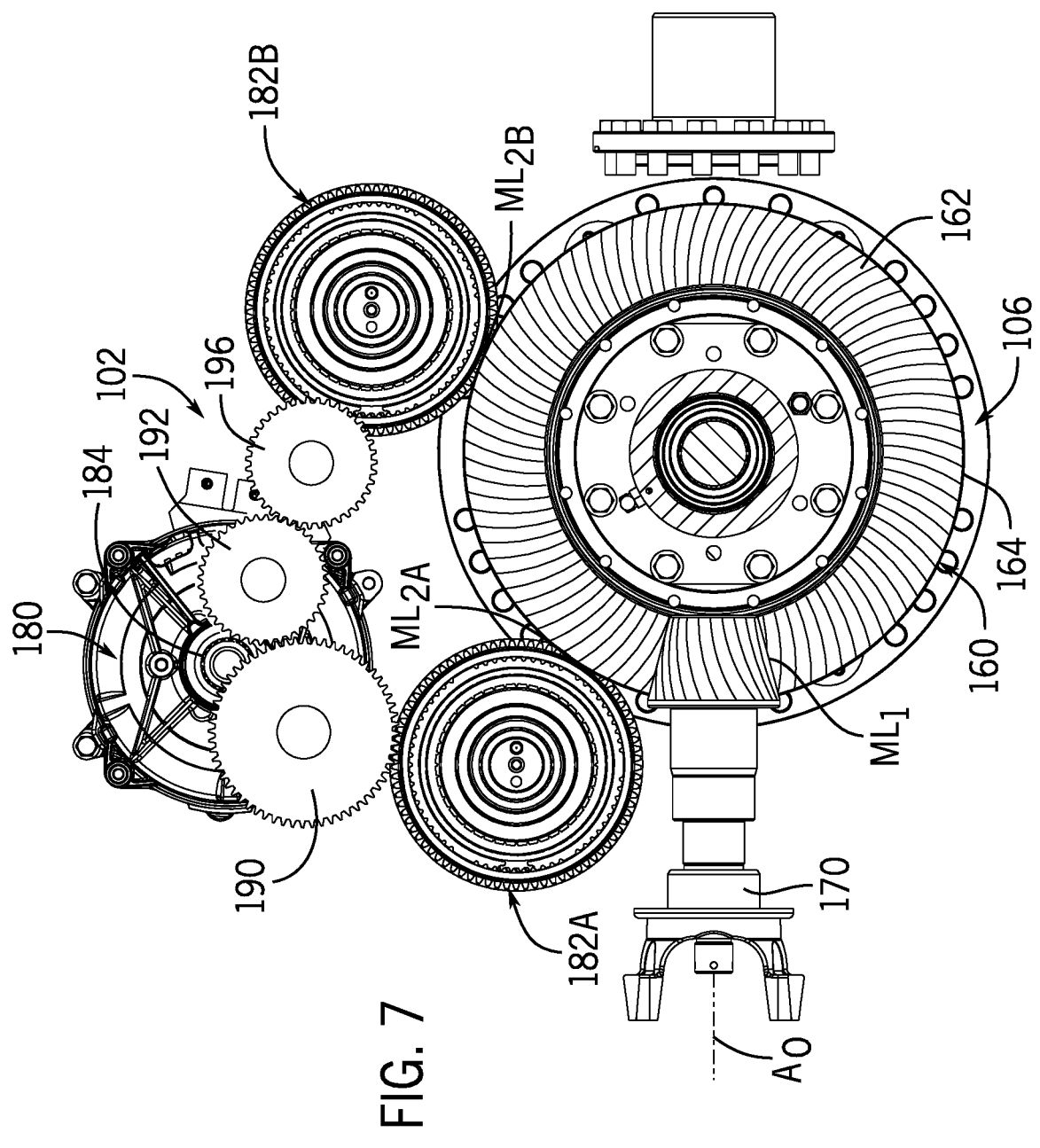
FIG. 7 is a sectional view thereof taken along line 7-7 of FIG. 4.

As shown in FIGS. 3, 4, and 7, the drive gear 160 may be coupled to an output shaft 170 via teeth of an output shaft gear 172 meshing with the teeth of the annular beveled face 162 of the drive gear 160 at mesh location $ML_1$, such that rotation of the drive gear 160 about the wheel axis $A_W$ is translated into rotation of the output shaft 170 about an output axis $A_O$. The output axis $A_O$ extends at an angle (e.g., 90 degrees) from the wheel axis $A_W$ and may intersect or be offset from the wheel axis $A_W$ (e.g., vertically above or below). The cone angle of the drive gear 160 and the output shaft gear 172 may be the same or different. Various example implementations of the work vehicle 20 and output shaft 170 are discussed below with regard to FIGS. 13 and 14. As shown in FIGS. 4, 5, and 7, the drive gear 160 couples to the transmission 102 via teeth of a transmission gear meshing with the teeth of the circumferential edge 164 of the drive gear 160 at mesh location $ML_2$ in order to effect rotation of the drive gear 160 about the wheel axis $A_W$.

In the depicted example, the transaxle 100 includes and electric machine 180 and two gear sets 182A, 182B. In this example, the gear sets 182A, 182B are identical, thus providing a reduction in component variance of the assembly. In this example, the gear sets 182 are self-contained cartridge-type gear sets, which aid in assembly and reduce manufacturing complexity. Here, the gear sets 182A, 182B each provide two different speed modes, which, when combined, give the transmission 102 four speed modes. It will be understood that the example implementation is merely one possible example. In other implementations, the transmission may include more (e.g., three or more) or less (e.g., one) gear sets that may differ in configuration and modality such that the transmission has a different number of speed modes at one or more different gear ratios. Moreover, while a single electric machine is utilized in the example implementations shown and described herein, the transmission may have multiple electric machines. Also, the electric machine 180 may be embodied as any suitable electric machine for converting electrical power into torque and rotational movement. The electric machine 180 may therefore be implemented as an electric motor alone or packaged in combination with one or more gears.

In the depicted example, the electric machine 180 has a motor shaft 183 that drives a motor shaft gear 184 to rotate about a machine axis $A_M$ that is offset from and substantially (e.g., within 2 degrees of) parallel to the wheel axis $A_W$ to drive the gear sets 182A, 182B. As shown in FIG. 7, the electric machine 180 may be located vertically above the drive gear 160 and oriented laterally with the gear sets 182A, 182 positioned on opposite longitudinal (fore and aft) sides of the electric machine 180 such the machine axis $A_M$ and the wheel axis $A_W$, about which the drive gear 160 rotates, may define a plane P with the gear sets 182A, 182B being located on opposite sides of the plane P.

As noted above, the transmission 102 includes a gear train to transmit rotation from the electric machine 180 at one or more different gear ratios. Generally, the gear sets of the transmission 102 may either be configured to have unique gear ratios from one another, or if identical, as is the case with the gear sets 182A, 182B of the illustrated example, then they are coupled to the electric machine 180 by one or more gears or gear trains that provide different gear ratios. In either of these approaches, the transmissions 102 defines a combined set of gear ratios any of which may be independently selected by an operator or control algorithm.

Referring now to FIGS. 6, 7, 10 and 11A-11D, the power flow from the electric machine 180 to the drive gear 160 for one example gear train will be detailed in connection with the gear sets 182A, 182B that provide four speed modes of operation. After that will follow a discussion of a second example transmission 102' in connection with a single gear set cartridge 300 that provides three speed modes of operation, as shown in FIGS. 12A-12C.

In the illustrated example, the gear sets 182A, 182B are each coupled to the electric machine 180 for power transmission by a corresponding gear or gear train. In particular, the electric machine 180 is coupled to the gear set 182A by a gear 190 and to the gear set 182B by a gear train, including gears 192, 194, 196. Each of these gears 190-196 are a different diameter and tooth count, and the gear 190 provides a different gear ratio than the gear train 192-196. The gear ratios achieved by the combination of the gear set 182A and gear 190 may be interleaved with gear ratios achieved by the combination of the gear set 182B and the gear train 192-196. In this way, the identically configured two-speed gear sets 182A, 182B serve to allow the transmission 102 to provide four different speeds collectively. Generally, for M gear sets with N available gear ratios, the use of gears or gear trains with different gear ratios may achieve N×M different gear ratios. While different arrangements are envisioned, the gear train 192-196 are configured with the gears 192 and 194 being rigidly fixed to a common shaft 200 to co-rotate together, with gear 192 meshing with the motor shaft gear 184 and driving rotation of gear 196 as it meshes with gear 196, which, in turn, drives rotation of the gear set 182B.

In the gear set 182A, gear 190 is rigidly fixed to a common shaft 202A to co-rotate with gears $G_{1A}$, $G_{2A}$. Gear $G_{1A}$ meshes with gear $G_{3A}$ and gear $G_{2A}$ meshes with gear $G_{4A}$. Gear $G_{3A}$ and gear $G_{4A}$ are rotatably coupled to a common shaft 204A so as to rotate independently. An annular shaft sleeve 206A is coaxial with and rotates about the shaft 204A and to which is rigidly mounted for co-rotation therewith an output gear $G_{OA}$. which may be considered a speed "range" gear. A clutch $C_{1A}$ is disposed operatively between the shaft sleeve 206A and gear $G_{3A}$, and a clutch $C_{2A}$ is disposed operatively between the shaft sleeve 206A and gear $G_{4A}$. Selective alternate engagement of clutch $C_{1A}$ and clutch $C_{2A}$, via the controller 38 of the control system 36, provides for different operational speed modes of the gear set 182A. The output gear $G_{OA}$ meshes with the outer circumferential edge 164 of the drive gear 160 at the mesh location $ML_{2A}$ to transmit power from the gear set 182A to the drive gear 160 and through to the differential assembly 130 in order to provide tractive power to the ground-engaging members 24 of the work vehicle 20 in one or the other speed mode.

Similarly, in the gear set 182B, gear 196 is rigidly fixed to a common shaft 202B to co-rotate with gears $G_{1B}$, $G_{2B}$. Gear $G_{1B}$ meshes with gear $G_{3B}$ and gear $G_{2B}$ meshes with gear $G_{4B}$. Gear $G_{3B}$ and gear $G_{4B}$ are rotatably coupled to a common shaft 204B so as to rotate independently. An annular shaft sleeve 206B is coaxial with and rotates about the shaft 204B and to which is rigidly mounted for co-rotation therewith an output gear $G_{OB}$ which may be considered a speed "range" gear. A clutch $C_{1B}$ is disposed operatively between the shaft sleeve 206B and gear $G_{3B}$, and a clutch $C_{2B}$ is disposed operatively between the shaft sleeve 206B and gear $G_{4B}$. Selective alternate engagement of clutch $C_{1B}$ and clutch $C_{2B}$, via the controller 38 of the control system 36, provides for different operational speed modes of the gear set 182B. The output gear $G_{OB}$ meshes with the outer circumferential edge 164 of the drive gear 160 at the mesh location $ML_{2B}$ to transmit power from the gear set 182B to the drive gear 160 and through to the differential assembly 130 in order to provide tractive power to the ground-engaging members 24 of the work vehicle 20 in one or the other speed mode.

With that understanding of the gear sets 182A, 182B and the following clutch engagement table, the power flows for each of the four operational speed modes of the example transmission 102 will now be detailed. FIGS. 11A-11D depict diagrammatically the four operational transmission speed modes of the transmission 102 in which the power flow paths through the gear sets 182A, 182B are shown bolded.

| Mode | Clutch $C_{1A}$ | Clutch $C_{2A}$ | Clutch $C_{1B}$ | Clutch $C_{2B}$ |
|---|---|---|---|---|
| 1 | | | | x |
| 2 | | | x | |
| 3 | | x | | |
| 4 | x | | | |

Figure 11A:
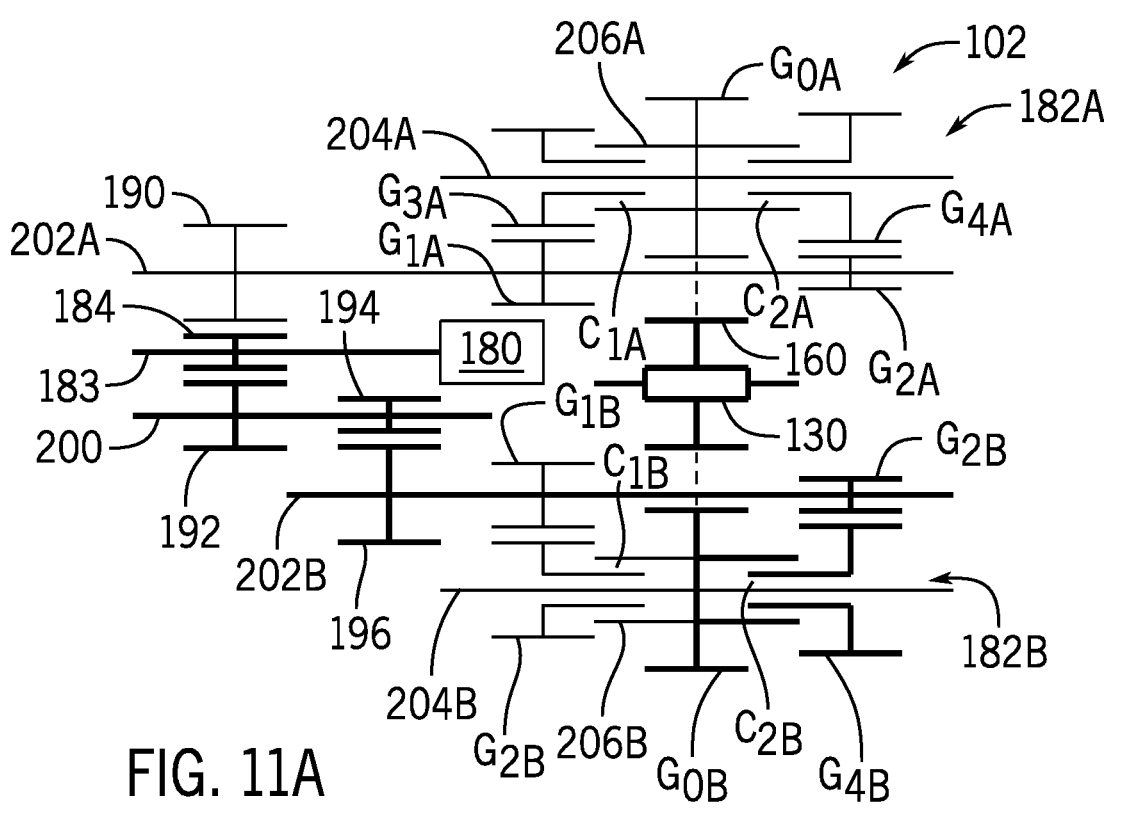
FIGS. 11A-11D are stick diagrams depicting gears and power flow of a first example transmission of the example electric transaxle of FIG. 2.
Figure 11B:
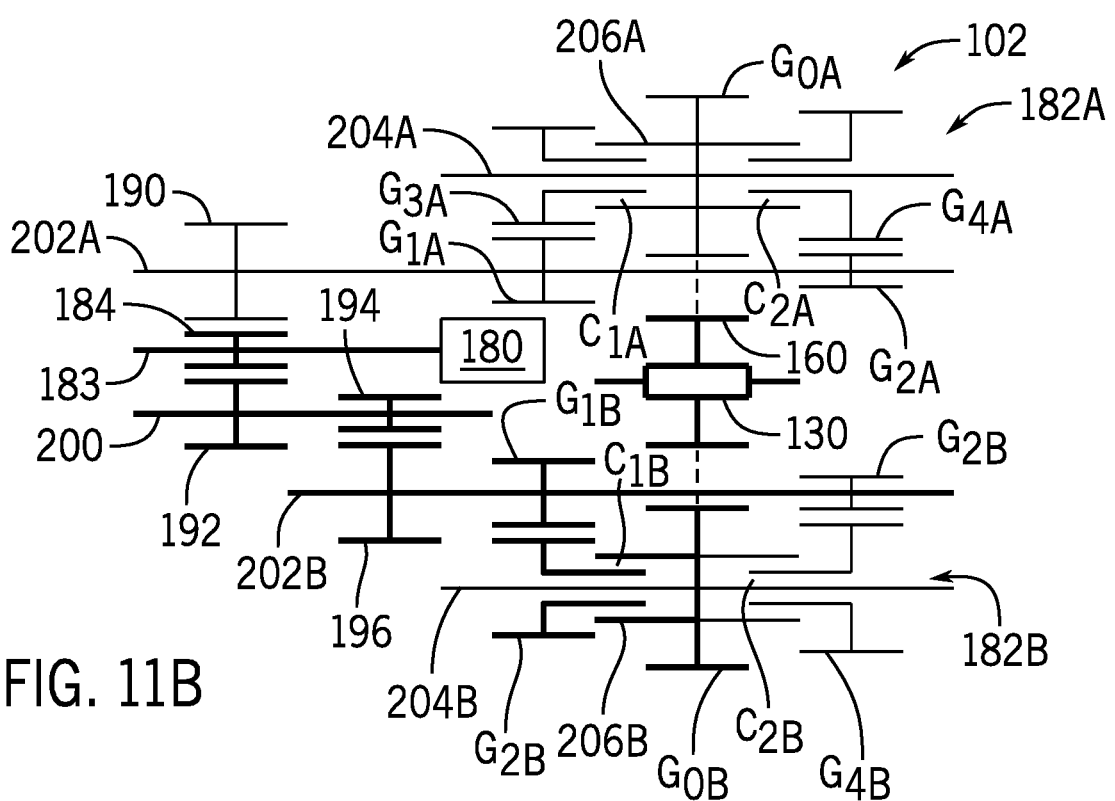
Figure 11C:
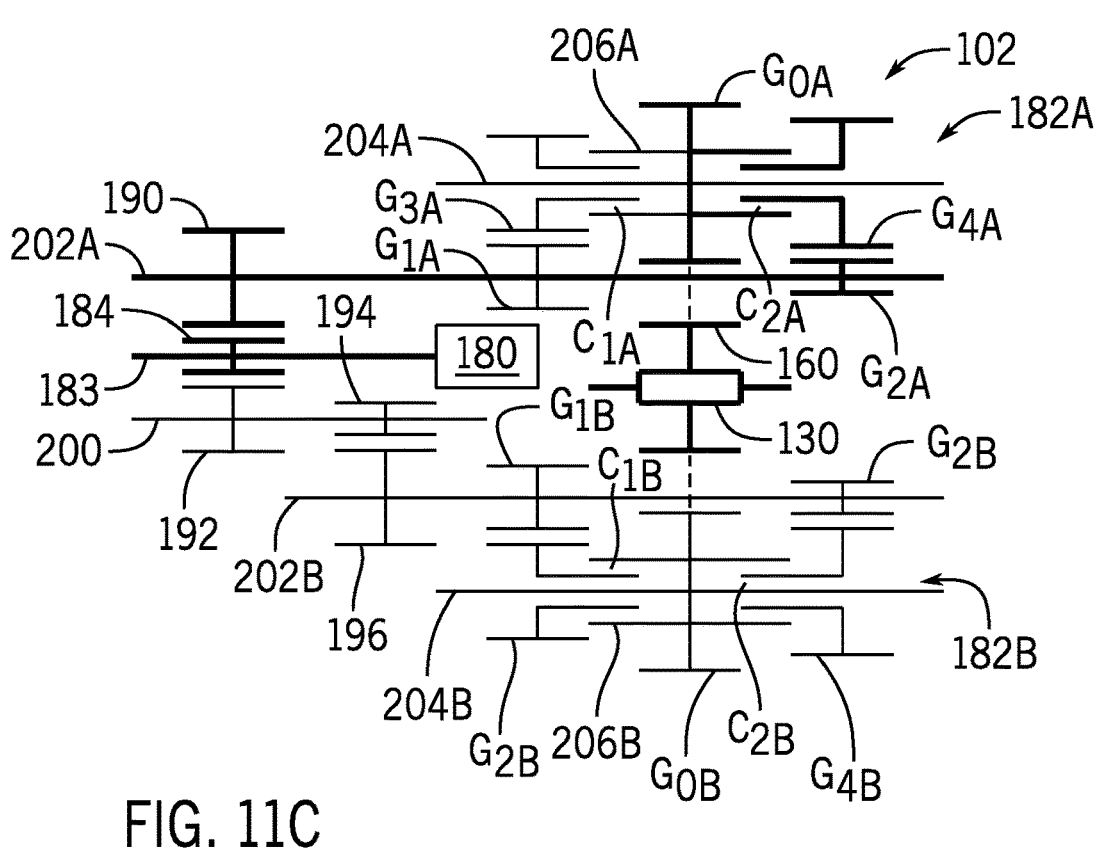
Figure 11D:
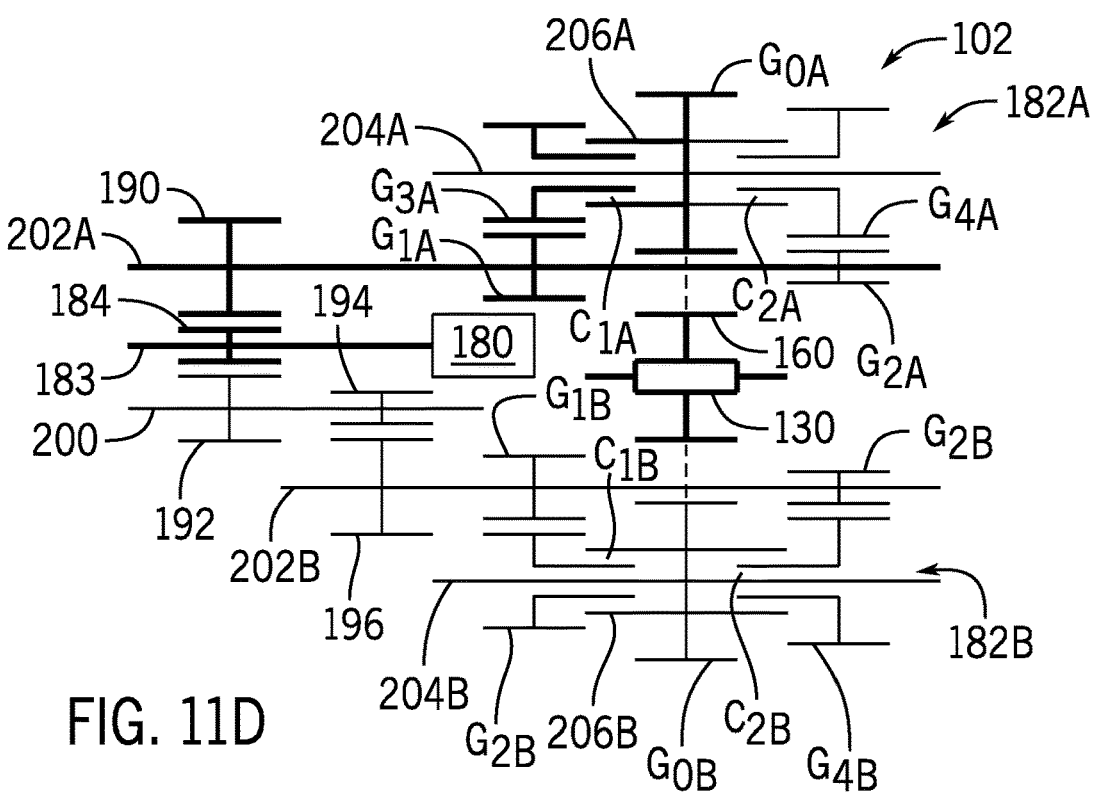
Figures 12A, 12B, 12C:
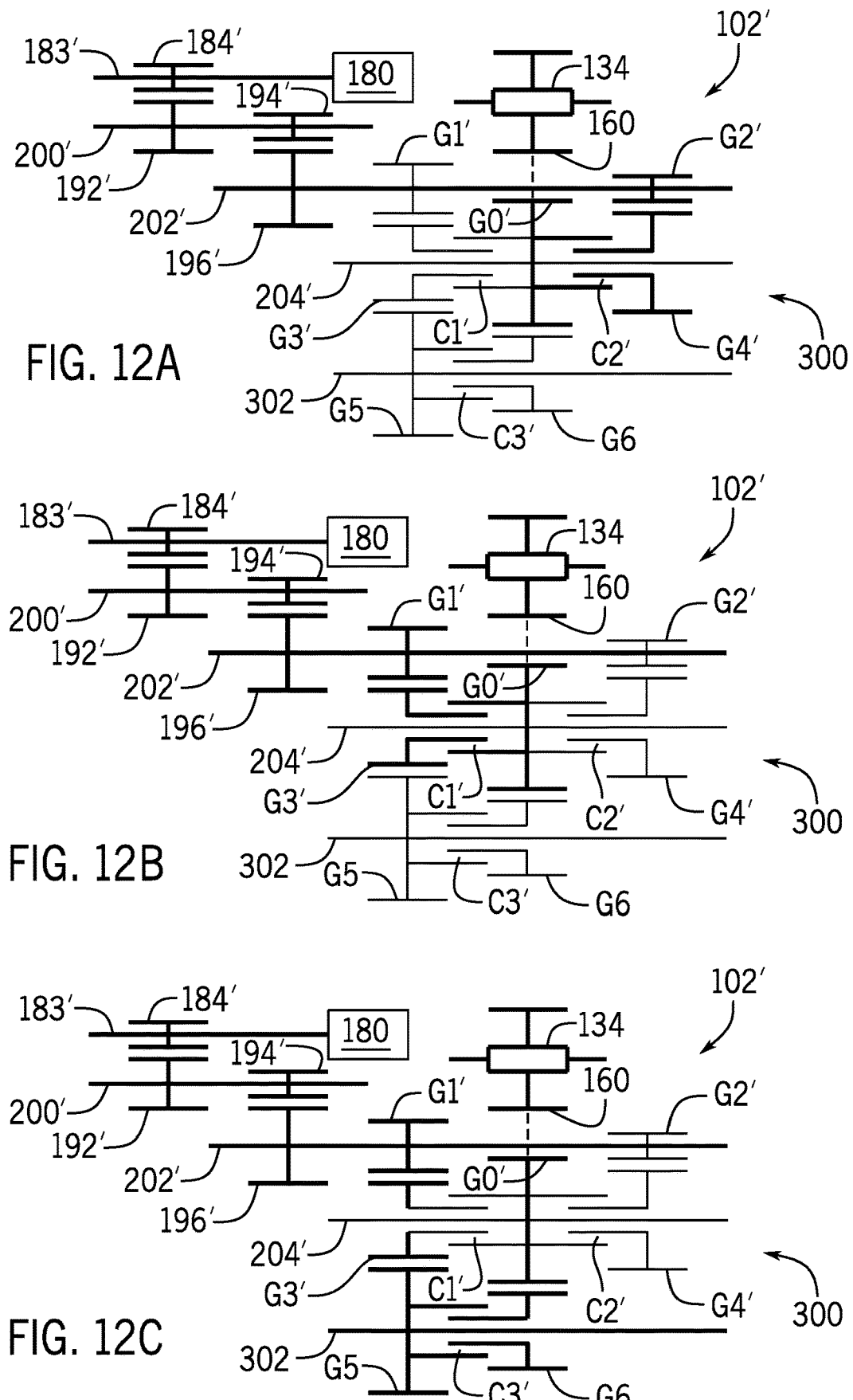
FIGS. 12A-12C are stick diagrams depicting gears and power flow of a second example transmission of the example electric transaxle of FIG. 2.

Specifically, in the first operational transmission mode or speed shown in FIG. 11A, power from the electric machine 180 is transmitted from the motor shaft gear 184 to gear 192 and through the shaft 200 to gear 194 which meshes with gear 196. From the gear train 192-196, power flows via the shaft 202B to gear $G_{2B}$ which meshes with gear $G_{4B}$. With clutch $C_{2B}$ engaged (and all other clutches disengaged), power is transmitted from gear $G_{4B}$ to the shaft sleeve 206B and to the output gear $G_{OB}$, which then meshes with the drive gear 160. In the second operational transmission speed mode shown in FIG. 11B, power from the electric machine 180 is transmitted through the gear train 192-196, as described with respect to FIG. 11A, and then flows via the shaft 202B to gear $G_{1B}$ which meshes with gear $G_{3B}$. With clutch $C_{1B}$ engaged (and all other clutches disengaged), power is transmitted from gear $G_{3B}$ to the shaft sleeve 206B and to the output gear $G_{OB}$, which then meshes with the drive gear 160. In the third operational transmission mode or speed shown in FIG. 11C, power from the electric machine 180 is transmitted through the gear 190 then flows via the shaft 202A to gear $G_{2A}$ which meshes with gear $G_{4A}$. With clutch $C_{2A}$ engaged (and all other clutches disengaged), power is transmitted from gear $G_{4A}$ to the shaft sleeve 206A and to the output gear $G_{OA}$, which then meshes with the drive gear 160. In the fourth operational transmission speed mode shown in FIG. 11D, power from the electric machine 180 is transmitted through the gear 190 and the shaft 202A to gear $G_{1A}$ which meshes with gear $G_{3A}$. With clutch $C_{1A}$ engaged (and all other clutches disengaged), power is transmitted from gear $G_{1A}$ to the shaft sleeve 206A and to the output gear $G_{OA}$, which then meshes with the drive gear 160.

The second example transmission 102' in connection with a single gear set cartridge 300 that provides three speed modes of operation, as shown in FIGS. 12A-12C, will now be described. Here, the electric machine 180' drives the motor shaft gear 184' on motor shaft 183' to mesh with a gear train 192'-196' (with gears 192' and 194' on common shaft 200') similar in manner to that described above with regard to the power transmission to the gear set 182B. Gear 196' is rigidly fixed to a common shaft 202' to co-rotate with gears $G_{1'}$, $G_{2'}$. Gear $G_{1'}$ meshes with gear $G_{3'}$ and gear $G_{2'}$ meshes with gear $G_{4'}$. Gear $G_{3'}$ and gear $G_{4'}$ are rotatably coupled to a common shaft 204' so as to rotate independently. An annular shaft sleeve 206' is coaxial with and rotates about the shaft 204' and to which is rigidly mounted for co-rotation therewith an output gear $G_{O'}$. A gear $G_5$ rigidly mounts to another shaft 302 which also supports a gear $G_6$ so as to be rotatable relative to gear $G_5$. A clutch $C_{1'}$ is disposed operatively between the shaft sleeve 206' and gear $C_{3'}$, a clutch $C_{2'}$ is disposed operatively between the shaft sleeve 206' and gear $G_{4'}$, and a clutch $C_3$ is operably disposed between gear $G_5$ and gear $G_6$. Selective alternate engagement of clutch $C_{1'}$, clutch $C_{2'}$ and clutch $C_3$, via the controller 38 of the control system 36, provides for different operational speed modes of the gear set 300. The output gear $G_{O'}$ meshes with the outer circumferential edge 164 of the drive gear 160 to transmit power from the gear set 300 to the drive gear 160 and through to the differential assembly 130 in order to provide tractive power to the ground-engaging members 24 of the work vehicle 20 in one of three speed modes.

With that understanding of the gear set 300 and the following clutch engagement table, the power flows for each of the three operational transmission speed modes of the second example transmission 102' will now be detailed. FIGS. 12A-12C depict diagrammatically the three operational transmission speed modes of the transmission 102' in which the power flow paths through the gear set 300 are shown bolded.

| Mode | Clutch $C_{1'}$ | Clutch $C_{2'}$ | Clutch $C_3$ |
|---|---|---|---|
| 1 | | x | |
| 2 | x | | |
| 3 | | | x |

Specifically, in the first operational transmission speed mode shown in FIG. 12A, power from the electric machine 180 is transmitted from the motor shaft gear 184' to gear 192' and through the shaft 200' to gear 194' which meshes with gear 196'. From the gear train 192'-196', power flows via the shaft 202' to gear $G_{2'}$ which meshes with gear $G_{4'}$. With clutch $G_{2'}$ engaged (and all other clutches disengaged), power is transmitted from gear $G_{4'}$ to the shaft sleeve 206' and to the output gear $G_O$, which then meshes with the drive gear 160. In the second operational transmission speed mode shown in FIG. 12B, power from the electric machine 180 is transmitted through the gear train 192'-196', as described with respect to FIG. 12A, and then flows via the shaft 202' to gear $G_1$, which meshes with gear $G_3$. With clutch $C_1$, engaged (and all other clutches disengaged), power is transmitted from gear $G_3$, to the shaft sleeve 206' and to the output gear $G_O$, which then meshes with the drive gear 160. In the third operational transmission speed mode shown in FIG. 12C, power from the electric machine 180 is transmitted through the gear train 192'-196', as described with respect to FIG. 12A, and then flows via the shaft 202' to gear $G_1$, which meshes with gear $G_3$, which in turn meshes with gear $G_5$. With clutch $C_3$ engaged (and all other clutches disengaged), power is transmitted to gear $G_6$ and in turn to the output gear $G_{O4}$, which then meshes with the drive gear 160.

Figure 13:
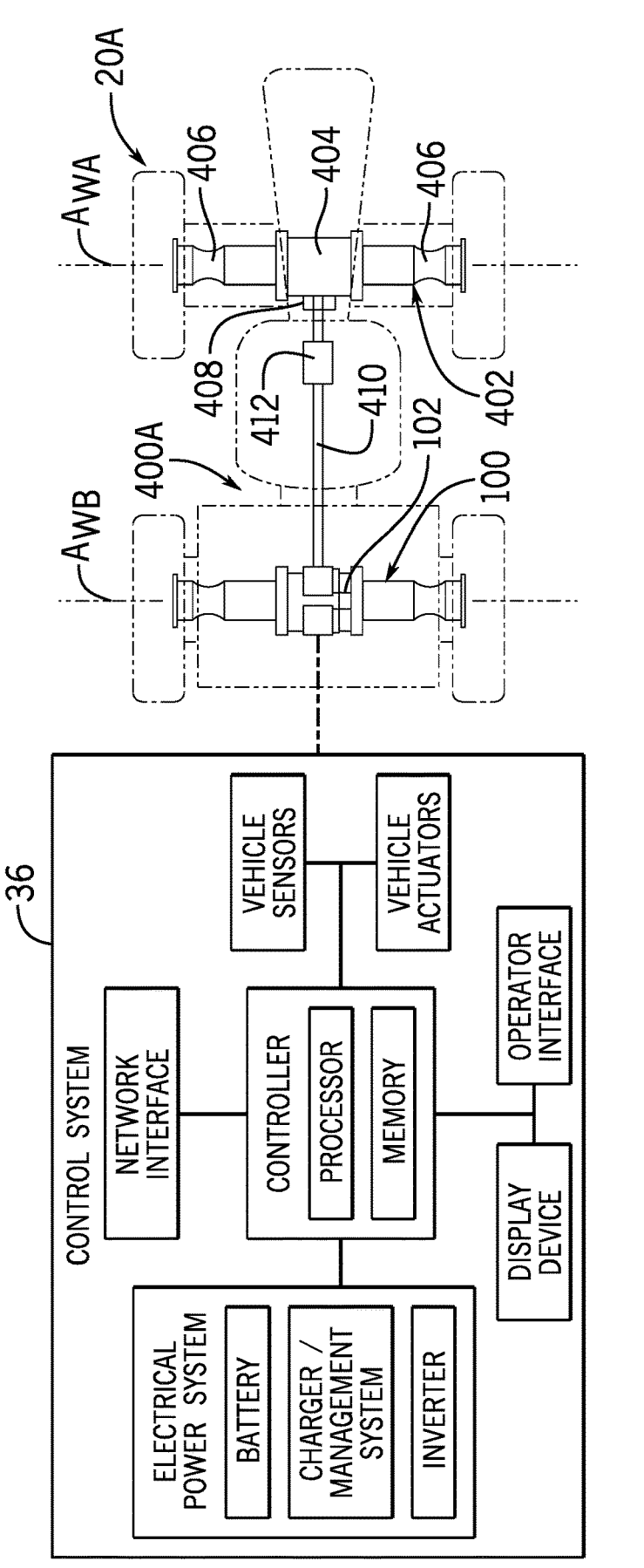
FIG. 13 is a schematic representation of a work vehicle incorporating the example electric transaxle of FIG. 2 as a rear transaxle and transmitting power via a transfer shaft to an unpowered, mechanical only, front transaxle.
Figure 14:
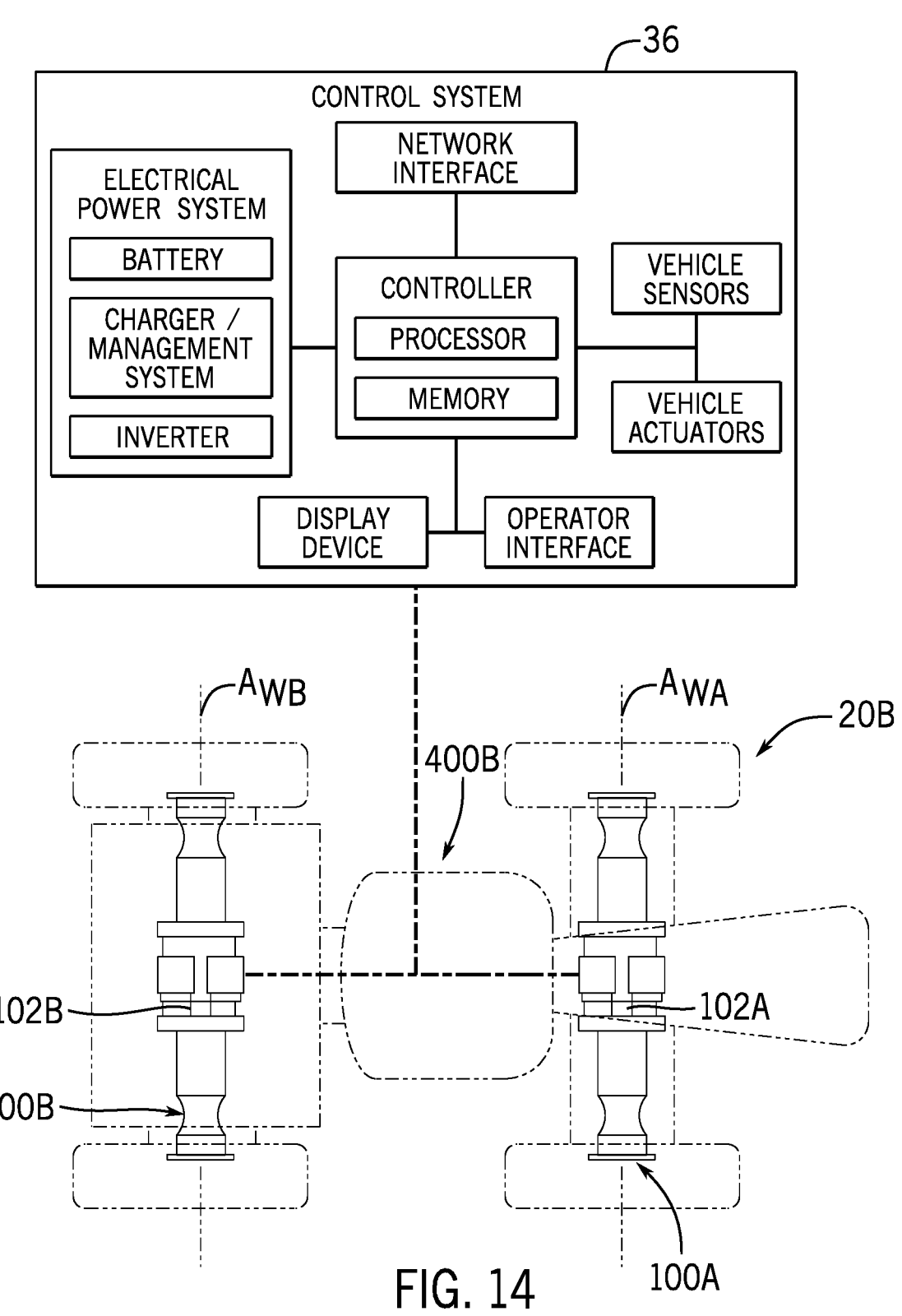
FIG. 14 is a schematic representation of a work vehicle incorporating the example electric transaxle of FIG. 2 as a front transaxle and a rear transaxle without mechanical interconnection.

The electric transaxle disclosed herein, such as embodied in the electric transaxle 100 described above, may be incorporated into the drivetrain of a work vehicle in various implementations. In certain drivetrains, the electric transaxle may be the sole assembly for providing tractive power to the work vehicle or to a powered work implement coupled to the work vehicle. The electric transaxle may then be the only transaxle in the drivetrain, or the drivetrain may include multiple transaxles in which the other transaxles are unpowered (e.g., without an electric machine, and thus which may be referred to as mechanical-only transaxles) but may contain various speed and reduction gearing and differential assemblies. In the multi-transaxle context, the electric transaxle may deliver power to the unpowered or mechanical-only transaxle(s) such that the electric transaxle is mechanically linked or coupled directly to the unpowered or mechanical-only transaxle to impart rotational power thereto. In other drivetrains, the electric transaxle may be one of multiple electric transaxles of the same or different configuration in which case the electric transaxles may be uncoupled in terms of mechanical power flow, but may, instead, be operatively coupled electrically for coordinated operation in providing tractive power to the ground-engaging members of the work vehicle. FIGS. 13 and 14 provide examples (represented schematically) of a single electric transaxle drivetrain and a dual electric transaxle drivetrain, respectively, employing the example electric transaxle 100. It will be understood that other electric transaxle and drivetrain configurations are contemplated.

Referring now to FIG. 13, a work vehicle 20A includes a drivetrain 400A including the electric transaxle 100 aligned about a wheel axis $A_{WB}$ used in combination with another transaxle 402 aligned about a wheel axis $A_{WA}$. Here, the transaxle 402 is unpowered or mechanical-only and is driven exclusively by rotational power transmitted by the electric transaxle 100. The transaxle 402 may be embodied as any conventional transaxle known in the art such as conventionally driven by an internal combustion engine by way of a drive shaft. For example, the transaxle 402 may include one or more axle housings containing a transaxle gear set and differential assembly 404 and wheel end units 406 (with elongated rotating hubs and final reduction gear sets of the type shown with respect to the electric transaxle 100) coupling power from the assembly 404 to the ground-engaging members mounted on either end of the transaxle 402.

The transaxle 402 may be mechanically coupled to the electric transaxle 100 output shaft 170 in various ways in order to receive rotational power. For example, the transaxle 402 may include an input arrangement 408 (e.g., including an input shaft and gear or gear train) that mechanically couples to the assembly 404. The input arrangement 408 is, in turn, mechanically coupled to the output shaft 170 of the electric transaxle 100 via a transfer shaft 410 that may be one monolithic shaft or an assembly of multiple shaft sections. The transfer shaft 410 may include or be coupled by any suitable coupling structures (e.g., yokes, gears, splines and so on) to the output shaft and the input arrangement 408.

The electric transaxle 100 may provide 1:1 rotational power transfer from the output shaft 170 to the input arrangement 408 via the transfer shaft 410. The electric transaxle 100 may provide power transfer at other ratios with the inclusion of one or more gear reduction assemblies incorporated into the drivetrain 400A (e.g., within the electric transaxle 100 itself, at the input arrangement 408, or some other location onboard the work vehicle 20A external to both the electric transaxle 100 and the transaxle 402). The rotational power transferred from the electric transaxle 100 to the transaxle 402 via the transfer shaft 410 may be continuous rotational power or it may be selective intermittent power through the use of a clutch assembly 412 that may be operatively coupled to the control system 36.

The control system 36 may be used to control the clutch assembly 412 manually (e.g., by operator input via the operator interface 34 or the display device 32) or automatically (e.g., via control commands derived from or otherwise according to shift logic stored in the memory 42 and processed by the processor 40 of the controller 38). The clutch assembly 412 may be operated (manually or automatically) to effect various inter-transaxle drive modes of operation. For example, in a first drive mode, the clutch assembly 412 may be controlled to disengage and operatively decouple the output shaft 170 from the input arrangement 408. In this drive mode, the transaxle 402 is passively operated since it receives no rotational power from the electric transaxle 100. In this case, the associated ground-engaging members will rotate passively by frictional engagement with the ground during travel of the work vehicle 20A. This mode may thus be considered a two-wheel drive mode in certain implementations. In a second drive mode, the clutch assembly 412 may be controlled to engage and operatively couple the output shaft 170 to the input arrangement 408 to provide rotational power via the transfer shaft 410. In this drive mode, the transaxle 402 is actively powered by the electric transaxle 100 to provide rotational power to the transaxle 402 and thereby rotate the associated ground-engaging members with tractive power to drive the work vehicle 20A. This mode may thus be considered a four-wheel or all-wheel drive mode in certain implementations. In a third drive mode, the clutch assembly 412 may be controlled to selectively partially engage (or disengage) to partially decouple or reduce engagement of the output shaft 170 with the input arrangement 408 to permit a controlled amount of slip, which may be used to vary the rotational speed of the input arrangement 408 relative to the output shaft 170 and thus permit a speed differential between the ground-engaging members associated with the electric transaxle 100 as compared to that of the transaxle 402. This may serve to provide transient speed or torque variance between front and rear wheels that may be beneficial in certain operational situations of the work vehicle 20A (e.g., to improve traction when the work vehicle 20A encounters varied or intermittent off-road terrain).

Referring now to FIG. 14, the work vehicle 20B may include a drivetrain 400B with two electric transaxles, such as two identical electric transaxles 100A, 100B, as described above herein, being aligned about respective wheel axes $A_{WA}$ and $A_{WB}$. As noted above, in such drivetrain implementations, the electric transaxles may be uncoupled mechanically, that is, without a conjoining transfer shaft to transfer rotational power between the electric transaxles, but may be operatively coupled to the controller 38 for coordinated operation by the control system 36. As in other examples, the control system 36 may allow for operator input via the operator interface 34 or the display device 32 or automatically control the electric transaxles 100 according to shift logic stored in the memory 42 and processed by the processor 40 of the controller 38. The control system 36 will also receive inputs from the vehicles sensors 44, as described above, to inform the control system 36 of various parameters or characteristics (e.g., speed, heading, orientation, loading, etc.) of the work vehicle 20B, including any onboard or attached work implements. Various aspects of a work vehicle drivetrain, such as drivetrain 400B, with multiple electric transaxles 100 will now be discussed with reference to FIG. 15.

Figure 15:
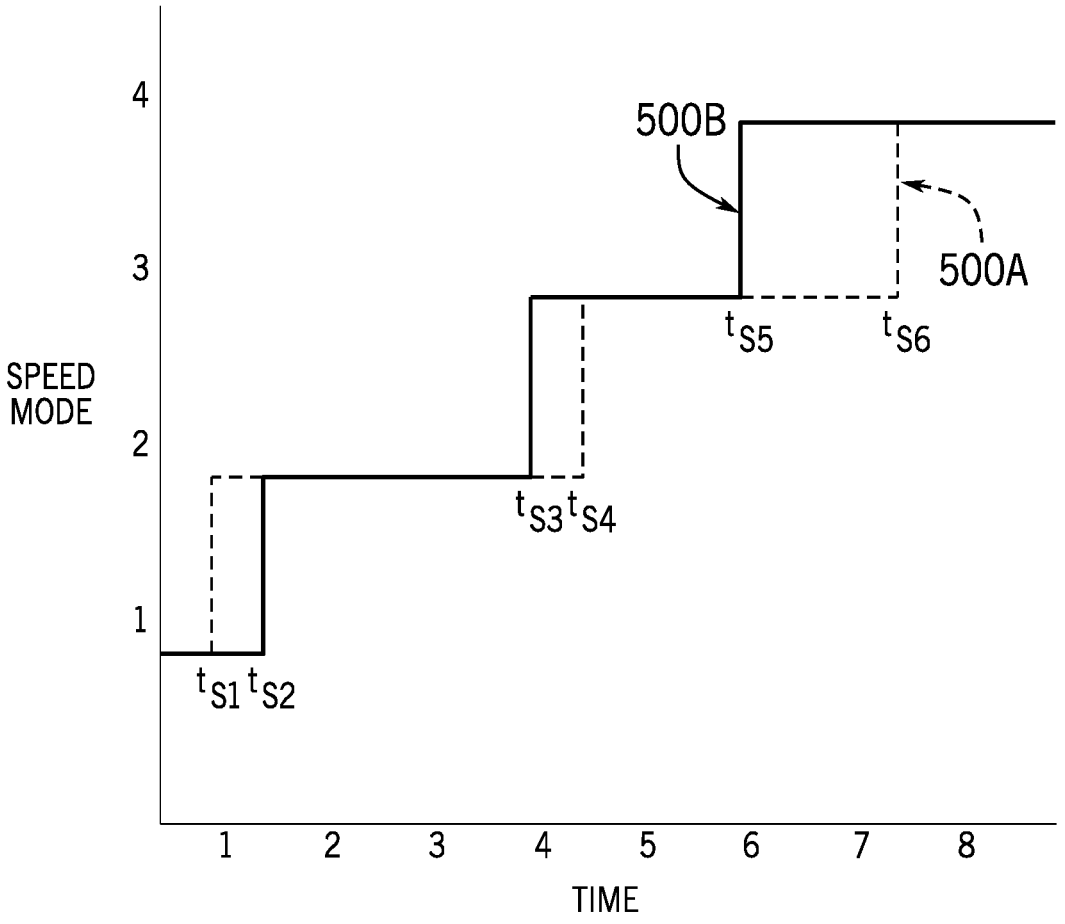
FIG. 15 is a plot showing an example shift pairing sequence in accordance with control logic of the present disclosure.

FIG. 15 shows a shift plot of example shift logic for the multi-speed powered transmissions 102A, 102B of the respective electric transaxles 100A, 100B showing the four speed modes (y-axis) in relation to time (x-axis). The shift plot 500A (shown in dashed line) refers to the transmission 102A of the electric transaxle 100A, and the shift plot 500B (shown in solid line) refers to the transmission 102B of the electric transaxle 100B. In the illustrated example, the electric transaxle 100A is at the front end of the work vehicle 20B, and the electric transaxle 100B is at the rear end of the work vehicle 20B, which accelerates in the forward travel direction T. As will be explained below, an opposite arrangement of the electric transaxles 100A, 100B and/or reversal of the travel direction of the work vehicle 20B may, and will likely, alter the shift plot significantly (e.g., reverse or flip the shift pair sequences).

As is apparent in FIG. 15, the shift times ($t_S$) at which occur shift events of the transmissions 102A, 102B of the electric transaxles 100A, 100B may be different from one another, although it should be noted that one or more shift points for the various speed modes may also be completed simultaneously (i.e., at the same time). Various parameters may be utilized by the operator or the shift logic to select the shift pair sequence (i.e., the relative difference in shifting times), which may include some or all of the speed, heading, orientation, and loading characteristics of the work vehicle 20B. All of these parameters (and others) may be sensed by the vehicle sensors 44 and provided as input signals to the controller 38. For example, work vehicle speed and heading may be discerned from an onboard GPS system. Loading characteristics May be determined by sensing displacement of suspension components or pressure of hydraulic components of the work vehicle 20B, and strain sensors may sense draft forces exerted on the work vehicle 20B from a towed implement. Work vehicle orientation (e.g., pitch and roll) may be sensed using onboard MEMS IMU devices embedded in the control system hardware or at other locations of the work vehicle 20B.

As noted, the controller 38 may be configured to process control logic to receive from the sensors 44 input pertaining to the speed, heading, and loading characteristics of the work vehicle 20B. The controller 38 will process the control logic to determine a shift pair sequence for shifting the transmission 102A of the electric transaxle 100A and the second transmission 102B of the electric transaxle 100B based on the received input signals. In the illustrated example, a shift pair sequence will be established for each speed mode of the transmissions 102A, 102B, may define a shift time $t_{S1}$ for shifting the transmission 102A and a shift time $t_{S2}$ for shifting the transmission 102B at from a given speed mode (e.g., from speed mode 1 to speed mode 2). As noted, the shift time $t_{S1}$ may be the same or different than the shift time $t_{S2}$. The controller 38 will execute the control logic to generate a first shift command to shift the transmission 102A at the shift time $t_{S1}$ while the electric transaxle 100B drives the work vehicle 20B and to generate a second shift command to shift the transmission 102B at the shift time $t_{S2}$ while the electric transaxle 100A drives the work vehicle 20B.

Generally, the controller 38 may determine a given shift pair sequence such that the shift time (e.g., $t_{S1}$) of one transmission (e.g., transmission 102A) is before the shift time (e.g., $t_{S2}$) of the other transmission (e.g., transmission 102B) when the loading on one electric transaxle (e.g., electric transaxle 100A) is less than the loading on the other electric transaxle (e.g., the electric transaxle 100B) or when one electric transaxle (e.g., electric transaxle 100A) is vertically above the other transaxle (e.g., electric transaxle 100B). When the ground-engaging members of the work vehicle 20B encounter downwardly sloped terrain, the controller 38 may determine the shift pair sequence such that the shift time (e.g., $t_{S1}$) is after the shift time (e.g., $t_{S2}$). When the ground-engaging members of the work vehicle 20B encounter flat terrain, the controller 38 may determine the shift time $t_{S1}$ and the shift time $t_{S2}$ based on characteristics of work vehicle loading other than orientation. For example, when the work vehicle 20B carries the greater portion of the loading by one electric transaxle than the other, the controller 38 may determine the shift pair sequence such that the shift time of the lighter loaded electric transaxle is before the heavier loaded electric transaxle. In some cases, the controller 38 may resolve the shift pair sequence to include a shift time delta $\Delta t_S$ between shift times (e.g., $t_{S2}-t_{S1}$), which may be an absolute value agnostic to being positive or negative. The shift time delta $\Delta t_S$ may be greater when the work vehicle 20B is on level ground than when on sloped or pitched ground. The shift time delta $\Delta t_S$ may also be greater when the work vehicle 20B is below a prescribed threshold load capacity, thereby allowing more dwell time for a given shift sequence to effect a smoother or seamless shift at a given speed mode.

In one scenario shown by $t_{S1}$ and $t_{S2}$ in FIG. 15, the work vehicle 20B may be traveling uphill (e.g., incline greater than 5 degrees). The more elevated (i.e., vertically higher) electric transaxle 100A is shifted first at time $t_{S1}$ and the lower electric transaxle 100B is shifted second at time $t_{S2}$. The shift time delta $\Delta t_{S2-S1}$ may be relatively small compared to when the work vehicle 20B is on level ground (e.g., between +/−5 degrees) to execute the shift event, and thereby provide tractive power to the work vehicle 20B, more quickly. The difference in shift times may decrease as the incline angle increases such that smoothness of shifting is decreased in favor of providing more continuous power to the ground-engaging members.

In a second scenario shown by $t_{S3}$ and $t_{S4}$ in FIG. 15, the work vehicle 20B is going downhill (e.g., decline greater than 5 degrees). The more elevated electric transaxle 100B is shifted first at time $t_{S3}$ and the lower electric transaxle 100A is shifted second at time $t_{S4}$. The difference in shift time delta $\Delta t_{S4-S3}$ may be small compared to shift times when the work vehicle 20B is on level ground (e.g., decline less than 5 degrees). The difference in shift times may decrease as the decline angle increases.

In a third scenario shown by $t_{S5}$ and $t_{S6}$ in FIG. 15, the work vehicle 20B is on level ground (e.g., incline or decline less than 5 degrees) with the electric transaxle 100B loaded more than the electric transaxle 100A. In this example, the electric transaxle 100B is shifted first at time $t_{S5}$, and the electric transaxle 100A is shifted second at time $t_{S6}$. Here, the shift time delta $\Delta t_{S6\text{-}S5}$ may depend on other work vehicle parameters or characteristics, such as the travel speed or acceleration of the work vehicle 20B, such that, for example, the shift time delta $\Delta t_{S6\text{-}S5}$ may decrease with (e.g., in proportion to) the acceleration of the work vehicle 20B and increase with (e.g., in proportion to) the travel speed of the work vehicle 20B.

Thus, the shift pairings can be executed by the controller 38 according to stored shift logic that adhere to various rules, logic, or algorithms. For example, these may include rules or logic such as: the greater loaded electric transaxle being shifted first; the vertically higher electric transaxle being shifted first; the greater the pitch incline or decline the smaller the variance in shift times, the greater the travel speeds of the work vehicle the greater the variance in shift times in order to promote smooth operation; the greater the rate of acceleration the smaller the variance in shift times; and the shift time variance may be increased with decreased loading, such as increasing shift time variance when the loading is below a threshold value. Other rules, logic, and algorithms may also be incorporated into the shift logic stored onboard or transmitted to the work vehicle.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle having a chassis supported off the ground by ground-engaging wheels or tracks, the work vehicle comprising:

a first electric transaxle carried by the chassis and having first wheel end units with hubs rotatable about a first wheel axis via a first transaxle gear set to rotate a first set of the ground-engaging wheels or tracks, the first electric transaxle including a first electric machine having a first rotating shaft and a first transmission driven by the first electric machine and configured to effect multiple gear ratios;

a second electric transaxle carried by the chassis and having second wheel end units with hubs rotatable about a second wheel axis via a second transaxle gear set to rotate a second set of the ground-engaging wheels or tracks, the second electric transaxle including a second electric machine having a second rotating shaft and a second transmission driven by the second electric machine and configured to effect multiple gear ratios, wherein operation of the first electric transaxle is mechanically uncoupled from operation of the second electric transaxle;

one or more sensors to detect speed, heading, and loading characteristics of the work vehicle; and a controller having memory and processing architecture configured to process control logic to:

receive from the one or more sensors input of the speed, heading, and loading characteristics of the work vehicle;

determine a shift pair sequence for shifting the first transmission and the second transmission based on the received input of the speed, heading, and loading characteristics of the work vehicle, the shift pair sequence defining a shift time ($t_{S1}$) for shifting the first transmission and a shift time ($t_{S2}$) for shifting the second transmission in which the shift time $t_{S1}$ is the same or different than the shift time $t_{S2}$; and generate a first shift command to shift the first transmission at the shift time $t_{S1}$ while the second electric transaxle drives the work vehicle and generate a second shift command to shift the second transmission at the shift time $t_{S2}$ while the first electric transaxle drives the work vehicle.

2. The work vehicle of claim 1, wherein the controller determines the shift pair sequence such that the shift time $t_{S1}$ is before the shift time $t_{S2}$ when the loading on the first electric transaxle is lesser than the loading on the second electric transaxle.

3. The work vehicle of claim 1, wherein the controller determines the shift pair sequence such that the shift time $t_{S1}$ is before the shift time $t_{S2}$ when the first electric transaxle is vertically above the second electric transaxle.

4. The work vehicle of claim 1, wherein the controller determines the shift pair sequence to include a shift time delta ($\Delta t_S$) between the shift time $t_{S1}$ and the shift time $t_{S2}$.

5. The work vehicle of claim 4, wherein the shift time delta Ats is greater when the work vehicle is on level ground than when on sloped ground.

6. The work vehicle of claim 4, wherein the shift time delta Ats is greater when the work vehicle is below a threshold load capacity.

7. The work vehicle of claim 1, wherein the first electric transaxle is at a front of the chassis and the second electric transaxle is a rear of the chassis; and wherein the work vehicle accelerates in a forward direction of travel.

8. The work vehicle of claim 7, wherein, when the ground-engaging wheels or tracks of the work vehicle encounter upwardly sloped terrain, the controller determines the shift pair sequence such that the shift time $t_{S1}$ is before the shift time $t_{S2}$; and wherein, when the ground-engaging wheels or tracks of the work vehicle encounter downwardly sloped terrain, the controller determines the shift pair sequence such that the shift time $t_{S1}$ is after the shift time $t_{S2}$.

9. The work vehicle of claim 7, wherein, when the ground-engaging wheels or tracks of the work vehicle encounter flat terrain, the controller determines the shift time $t_{S1}$ and the shift time $t_{S2}$ based on loading of the work vehicle;

wherein, when the loading on the first electric transaxle is greater than the loading on the second electric transaxle, the controller determines the shift pair sequence such that the shift time $t_{S1}$ is before the shift time $t_{S2}$; and wherein, when the loading on the first electric transaxle is less than the loading on the second electric transaxle, the controller determines the shift pair sequence such that the shift time $t_{S1}$ is after the shift time $t_{S2}$.

10. The work vehicle of claim 1, wherein the first transmission has a first speed mode, a second speed mode, and a third speed mode; and wherein the second transmission has a first speed mode, a second speed mode, and a third speed mode.

11. The work vehicle of claim 10, wherein the controller receives sensor input indicating that:

the first electric transaxle is vertically above the second electric transaxle when the first and second transmissions shift from the first speed modes to the second speed modes; and the first electric transaxle is vertically below the second electric transaxle when the first and second transmissions shift from the second speed modes to the third speed modes;

wherein the controller determines the shift pair sequence for shifting the first transmission from the first speed mode to the second speed mode and shifting the second transmission from the first speed mode to the second speed mode such that the shift time $t_{S1}$ is before the shift time $t_{S2}$; and wherein the controller determines the shift pair sequence for shifting the first transmission from the second speed mode to the third speed mode and shifting the second transmission from the second speed mode to the third speed mode such that the shift time $t_{S1}$ is after the shift time $t_{S2}$.

12. The work vehicle of claim 1, wherein the one or more sensors are configured to detect loading in the form of draft forces exerted on the work vehicle from a towed implement.

13. A work vehicle having a chassis supported off the ground by ground-engaging wheels or tracks, the work vehicle comprising:

a first electric transaxle carried by the chassis and having first wheel ends to rotate a first set of the ground-engaging wheels or tracks about a first wheel axis, the first electric transaxle including a first electric machine having a first rotating shaft and a first transmission driven by the first electric machine and configured to effect multiple gear ratios;

a second electric transaxle carried by the chassis and having second wheel ends to rotated a second set of the ground-engaging wheels or tracks about a second wheel axis, the second electric transaxle including a second electric machine having a second rotating shaft and a second transmission driven by the second electric machine and configured to effect multiple gear ratios, wherein operation of the first electric transaxle is mechanically uncoupled from operation of the second electric transaxle;

one or more sensors to detect speed, heading, and loading characteristics of the work vehicle; and a controller having memory and processing architecture configured to process control logic to:

receive from the one or more sensors input of the speed, heading, and loading characteristics of the work vehicle;

determine a shift pair sequence for shifting the first transmission and the second transmission based on the received input of the speed, heading, and loading characteristics of the work vehicle, the shift pair sequence defining a shift time ($t_{S1}$) for shifting the first transmission and a shift time ($t_{S2}$) for shifting the second transmission in which the shift time $t_{S1}$ is the same or different than the shift time $t_{S2}$; and generate a first shift command to execute a first shift event for the first transmission at shift time $t_{S1}$ while the second electric transaxle drives the work vehicle and a second shift command to execute a second shift event for the second transmission at shift time $t_{S2}$ while the first electric transaxle drives the work vehicle;

wherein the controller determines the shift pair sequence such that the shift time $t_{S1}$ is before the shift time $t_{S2}$ when the loading on the first electric transaxle is lesser than the loading on the second electric transaxle or when the first electric transaxle is vertically above the second electric transaxle.

14. The work vehicle of claim 13, wherein the controller determines the shift pair sequence to include a shift time delta ($\Delta t_S$) between the shift time $t_{S1}$ and shift time $t_{S2}$; and wherein the shift time delta Ats is greater when the work vehicle is on level ground than when on sloped ground or when the work vehicle is below a threshold load capacity.

15. The work vehicle of claim 13, wherein the first electric transaxle is at a front of the chassis and the second electric transaxle is a rear of the chassis and wherein the work vehicle accelerates in a forward direction of travel.

16. The work vehicle of claim 15, wherein, when the ground-engaging wheels or tracks of the work vehicle encounter upwardly sloped terrain, the controller determines the shift pair sequence such that the shift time $t_{S1}$ is before the shift time $t_{S2}$; and wherein, when the ground-engaging wheels or tracks of the work vehicle encounter downwardly sloped terrain, the controller determines the shift pair sequence such that the shift time $t_{S1}$ is after the shift time $t_{S2}$.

17. The work vehicle of claim 15, wherein, when the ground-engaging wheels or tracks of the work vehicle encounter flat terrain, the controller determines the shift time $t_{S1}$ and the shift time $t_{S2}$ based on loading of the work vehicle;

wherein, when the loading on the first electric transaxle is greater than the loading on the second electric transaxle, the controller determines the shift pair sequence such that the shift time $t_{S1}$ is before the shift time $t_{S2}$; and wherein, when the loading on the first electric transaxle is less than the loading on the second electric transaxle, the controller determines the shift pair sequence such that the shift time $t_{S1}$ is after the shift time $t_{S2}$.

18. The work vehicle of claim 13, wherein the first transmission has a first speed mode, a second speed mode, and a third speed mode; and wherein the second transmission has a first speed mode, a second speed mode, and a third speed mode.

19. The work vehicle of claim 18, wherein the controller receives sensor input indicating that:

the first electric transaxle is vertically above the second electric transaxle when the first and second transmissions shift from the first speed modes to the second speed modes; and the first electric transaxle is vertically below the second electric transaxle when the first and second transmissions shift from the second speed modes to the third speed modes;

wherein the controller determines the shift pair sequence for shifting the first transmission from the first speed mode to the second speed mode and shifting the second transmission from the first speed mode to the second speed mode such that the shift time $t_{S1}$ is before the shift time $t_{S2}$; and wherein the controller determines the shift pair sequence for shifting the first transmission from the second speed mode to the third speed mode and shifting the second transmission from the second speed mode to the third speed mode such that the shift time $t_{S1}$ is after the shift time $t_{S2}$.

20. The work vehicle of claim 13, wherein the one or more sensors are configured to detect loading in the form of draft forces exerted on the work vehicle from a towed implement.

\*   \*   \*   \*   \*